United States Patent
Wang et al.

(10) Patent No.: US 12,034,975 B2
(45) Date of Patent: *Jul. 9, 2024

(54) CONDITIONAL SIGNALING OF SYNTAX ELEMENTS IN A PICTURE HEADER

(71) Applicants: Beijing Bytedance Network Technology Co., Ltd., Beijing (CN); Bytedance Inc., Los Angeles, CA (US)

(72) Inventors: Ye-Kui Wang, San Diego, CA (US); Zhipin Deng, Beijing (CN); Li Zhang, San Diego, CA (US); Kai Zhang, San Diego, CA (US); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/897,998

(22) Filed: Aug. 29, 2022

(65) Prior Publication Data

US 2023/0071429 A1    Mar. 9, 2023

Related U.S. Application Data

(63) Continuation of application No. PCT/CN2021/077560, filed on Feb. 24, 2021.

(30) Foreign Application Priority Data

Feb. 29, 2020  (WO) ............... PCT/CN2020/077331

(51) Int. Cl.
*H04N 19/70*  (2014.01)
*H04N 19/105*  (2014.01)
(Continued)

(52) U.S. Cl.
CPC .......... *H04N 19/70* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS 9,237,349 B2   1/2016   Tsai
9,560,367 B2   1/2017   Wang
(Continued)

FOREIGN PATENT DOCUMENTS

CA   3164388 A1 *  7/2021  ........... H04N 19/124
CN   103843340 A     6/2014
(Continued)

OTHER PUBLICATIONS

Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
(Continued)

*Primary Examiner* — Tyler W. Sullivan
(74) *Attorney, Agent, or Firm* — Conley Rose, P.C.

(57)  ABSTRACT

A video processing method includes performing a conversion between a video including one or more pictures and a bitstream of the video. The bitstream conforms to a format rule specifying that one or more syntax elements indicative of coding information are selectively included in a picture parameter set of the bitstream responsive to whether it is indicated that each picture referring to the picture parameter set includes a single slice.

20 Claims, 10 Drawing Sheets

(51) Int. Cl.

| | |
|---|---|
| H04N 19/117 | (2014.01) |
| H04N 19/169 | (2014.01) |
| H04N 19/172 | (2014.01) |
| H04N 19/174 | (2014.01) |
| H04N 19/189 | (2014.01) |
| H04N 19/196 | (2014.01) |
| H04N 19/46 | (2014.01) |
| H04N 19/58 | (2014.01) |
| H04N 19/635 | (2014.01) |
| H04N 19/82 | (2014.01) |
| H04N 19/86 | (2014.01) |
| H04N 19/127 | (2014.01) |

(52) U.S. Cl.

CPC ......... *H04N 19/172* (2014.11); *H04N 19/174* (2014.11); *H04N 19/188* (2014.11); *H04N 19/189* (2014.11); *H04N 19/197* (2014.11); *H04N 19/46* (2014.11); *H04N 19/58* (2014.11); *H04N 19/635* (2014.11); *H04N 19/82* (2014.11); *H04N 19/86* (2014.11); *H04N 19/127* (2014.11)

(56) References Cited

U.S. PATENT DOCUMENTS

| | | | |
|---|---|---|---|
| 11,463,736 | B2 | 10/2022 | Deshpande |
| 11,638,036 | B2 | 4/2023 | Nalci |
| 11,706,428 | B2 | 7/2023 | Choi |
| 2004/0218668 | A1 | 11/2004 | Hannuksela et al. |
| 2006/0050793 | A1 | 3/2006 | Wang et al. |
| 2013/0027230 | A1 | 1/2013 | Marpe et al. |
| 2013/0077677 | A1 | 3/2013 | Wang et al. |
| 2013/0188738 | A1 | 7/2013 | Hannuksela et al. |
| 2013/0188881 | A1 | 7/2013 | Zhao et al. |
| 2013/0322531 | A1 | 12/2013 | Chen et al. |
| 2014/0086324 | A1 | 3/2014 | Ramasubramonian et al. |
| 2015/0195576 | A1 | 7/2015 | Yu et al. |
| 2015/0195577 | A1 | 7/2015 | Hannuksela |
| 2016/0286238 | A1 | 9/2016 | Sato |
| 2018/0109810 | A1 | 4/2018 | Xu et al. |
| 2018/0199069 | A1 | 7/2018 | Nam et al. |
| 2019/0260990 | A1 | 8/2019 | Lim et al. |
| 2021/0084315 | A1* | 3/2021 | Chen .................. H04N 19/172 |
| 2021/0176501 | A1* | 6/2021 | Chen .................. H04N 19/117 |
| 2021/0266550 | A1 | 8/2021 | Li |
| 2021/0368192 | A1* | 11/2021 | Hu .................... H04N 19/463 |
| 2021/0385497 | A1* | 12/2021 | He .................... H04N 19/184 |
| 2022/0060684 | A1* | 2/2022 | Luo .................... H04N 19/132 |
| 2022/0217383 | A1 | 7/2022 | Wang |
| 2022/0321919 | A1* | 10/2022 | Deshpande ............ H04N 19/70 |
| 2022/0368909 | A1* | 11/2022 | Park .................. H04N 19/174 |
| 2022/0368930 | A1* | 11/2022 | Filippov ............. H04N 19/119 |
| 2022/0394286 | A1* | 12/2022 | Hendry ............... H04N 19/188 |
| 2022/0394301 | A1 | 12/2022 | Deshpande |
| 2022/0394306 | A1* | 12/2022 | Zhang ................ H04N 19/174 |
| 2022/0400260 | A1* | 12/2022 | Filippov ............. H04N 19/174 |
| 2023/0007256 | A1 | 1/2023 | Zhang |
| 2023/0008778 | A1* | 1/2023 | Wang ................. H04N 19/635 |
| 2023/0018055 | A1* | 1/2023 | Hendry ............... H04N 19/70 |
| 2023/0050232 | A1 | 2/2023 | Paluri |
| 2023/0051024 | A1* | 2/2023 | Hendry ............... H04N 19/105 |
| 2023/0071429 | A1 | 3/2023 | Wang |
| 2023/0085937 | A1* | 3/2023 | Deshpande ............ H04N 19/70 |

FOREIGN PATENT DOCUMENTS

| | | | |
|---|---|---|---|
| CN | 104025599 | A | 9/2014 |
| CN | 104243993 | A | 12/2014 |
| CN | 104396242 | A1 | 3/2015 |
| WO | 2007081106 | A1 | 7/2007 |
| WO | 2013027417 | A1 | 2/2013 |
| WO | 2018066562 | A1 | 4/2018 |
| WO | WO-2021079948 | A1 * | 4/2021 .......... H04N 19/105 |

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

"Information technology—High efficiency coding and media delivery in heterogeneous environments—Part 2: High Efficiency Video Coding", ISO/IEC JTC 1/SC 29/WG 11 N17661, Rec. ITU-T H.265 | ISO/IEC 23008-2 (in force edition), Apr. 20, 2018, 8 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Li, X., Retrieved from the Internet: https://vcgit.hhi.fraunhofer.de/jvet/VVCSoftware_VTM.git, VTM software, Nov. 2, 2022, 3 pages.

Document: JVET-Q0200-r2, Hendry, "[AHG9]: On picture level and slice level tool parameters," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.

Document: JVET-P2001-v9, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 495 pages.

Foreign Communication From A related Counterpart Application, International Application No. PCT/CN2021/077560, English Translation of International Search Report dated May 26, 2021, 10 pages.

Foreign Communication From A related Counterpart Application, International Application No. PCT/CN2021/077561, English Translation of International Search Report dated Apr. 2, 2021, 11 pages.

Foreign Communication From A related Counterpart Application, International Application No. PCT/CN2021/077562, English Translation of International Search Report dated May 28, 2021, 10 pages.

Foreign Communication From A related Counterpart Application, International Application No. PCT/CN2021/077563, English Translation of International Search Report dated May 21, 2021, 11 pages.

Non-Final Office Action dated Jan. 13, 2023, 17 pages, U.S. Appl. No. 17/897,967, filed Aug. 29, 2022.

Document: JVET-O0148-v1, Wang, Y.K., et al., "AHG17: On reference picture list signalling," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.

Document: JCTVC-E045, Tsai, C., et al., "CE4 Subset3: Slice Common Information Sharing," Joint Video Experts Team (JVET) of ITU-T SG 16 WP 3 and ISO/IEC JTC 1/SC 29/WG 11 5th Meeting: Geneva, CH, Mar. 16-23, 2019, 7 pages.

Document: JCTVC-F058-v2, Fu, C., et al., "Sample Adaptive Offset with PPS-level Syntax," Joint Collaborative Team on Video Coding (JCT-VC) of ITU-T SG 16 WP 3 and ISO/IEC JTC 1/SC 29/WG 11 6th Meeting: Torino, IT, Jul. 14-22, 2011, 4 pages.

Document: JVET-Q2001-v1, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 490 pages.

Non-Final Office Action dated Mar. 23, 2023, 29 pages, U.S. Appl. No. 17/897,835, filed Aug. 29, 2022.

Notice of Allowance dated Apr. 21, 2023, 8 pages, U.S. Appl. No. 17/897,967, filed Aug. 29, 2022.

Foreign Communication From A Related Counterpart Application, European Application No. 21759710.3, Extended European Search Report dated Apr. 5, 2023, 9 pages.

Foreign Communication From A Related Counterpart Application, European Application No. 21760278.8, Extended European Search Report dated Apr. 11, 2023, 11 pages.

Document: JVET-Q2001-vD, Bross, B., "Versatile Video Coding (Draft 8)," Joint Video Experts Team (JVET) of ITU-T SG 16 WP 3 and ISO/IEC JTC 1/SC 29/WG 11 17th Meeting: Brussels, BE Jan. 7-17, 2020, JVET-Q2001 (version 14), 24 pages.

(56) References Cited

OTHER PUBLICATIONS

Notice of Allowance from U.S. Appl. No. 17/897,835 dated Nov. 20, 2023.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, JVET-R0060-v1_SpecText.docx, 511 pages.
Document: JVET-Q0217-v1, Deshpande, S., et al., "On Reference Picture List Information Signalling," Joint Video Experts Team (JVET) of ITU-T SG 16 WP 3 and ISO/IEC JTC 1/SC 29/WG 11 17th Meeting: Brussels, BE, Jan. 7-17, 2020, 12 pages.
Document: JVET-Q0273, Pettersson, M., et al., "AHG9: Editorial changes related to picture header," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.

\* cited by examiner

CONDITIONAL SIGNALING OF SYNTAX ELEMENTS IN A PICTURE HEADER

CROSS REFERENCE TO RELATED APPLICATIONS

This application is a continuation of International Patent Application No. PCT/CN2021/077560, filed on Feb. 24, 2021, which claims the priority to and benefits of International Patent Application PCT/CN2020/077331, filed on Feb. 29, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video having one or more pictures and a coded representation of the video, wherein each of the one or more pictures comprise exactly one slice; wherein the coded representation conforms to a format rule; wherein the format rule specifies that picture parameter set flags are excluded from the coded representation due for picture having exactly one slice.

In another example aspect, another video processing method is disclosed. The method includes performing a conversion between a video slice of a video and a coded representation of the video, wherein the coded representation conforms to a format rule, wherein the format rule specifies to include a first field indicative of presence of a second field identifying a maximum index for a reference picture used for coding the video slice based on a condition; wherein the condition is representable as a logical expression "A & (B∥C)", in which A indicates "rpl_info_in_ph_flag=1, or NAL unit type is not equal to IDR, or sps_idr_rpl_present_flag is equal to 1", and "B" indicates "slice_type is equal to P or B, and the number of reference entries in reference picture list 0 is greater than 1", and "C" indicates "slice_type is equal to B and the number of reference entries in reference picture list 1 is greater than 1" and "&" is logical "and" operation and "∥" is logical "or" operation.

In another example aspect, another video processing method is disclosed. The method includes performing a conversion between a video region of a video and a coded representation of the video, wherein the coded representation conforms to a format rule, wherein the format rule specifies a condition that controls use of a syntax element indicative of a picture order count for a long term reference picture used for the conversion of the video region In another example aspect, another video processing method is disclosed. The method includes performing a conversion between a video region of a video and a coded representation of the video, wherein the coded representation conforms to a format rule, wherein the format rule specifies that reference picture related syntax structures are includes if and only if a variable X is equal to a specific value, wherein X depends on a slice type of the video region.

In another example aspect, another video processing method is disclosed. The method includes performing a conversion between a video comprising one or more pictures and a bitstream of the video; wherein the bitstream conforms to a format rule; wherein the format rule specifies that one or more syntax elements indicative of coding information are selectively included in a picture parameter set of the bitstream responsive to whether it is indicated that each picture referring to the picture parameter set comprises a single slice.

In another example aspect, another video processing method is disclosed. The method includes performing a conversion between a video comprising a plurality of pictures each comprising at least one slice and a bitstream of the video, wherein the bitstream conforms to a format rule; wherein the format rule specifies that a first flag in the bitstream indicates whether a picture header syntax structure of a picture is included in a slice header of a slice of the picture; and wherein the format rule specifies that, responsive to any of six flag s in a picture parameter set associated with the picture is equal to 1, the first flag is equal to 0.

In another example aspect, another vide processing method is disclosed. The method includes performing a conversion between a video comprising one or more pictures, each comprising at least one slice, and a bitstream of the video, wherein the bitstream conforms to a format rule, wherein the format rule specifies to include a first field indicative of presence of a second field identifying a maximum index for a reference picture used for coding a slice based on a condition; wherein the condition is representable as a logical expression "A & (B∥C)", in which: A indicates that a first flag indicating whether reference picture list information is included in a picture header syntax structure is equal to 1, or a network abstraction layer (NAL) unit type is not equal to an instantaneous decoding refresh (IDR) type, or a second flag indicating whether reference picture list information could be present in slice headers of slices with IDR NAL unit types is equal to 1, B indicates that a slice type is equal to P or B, and a number of reference entries in reference picture list 0 is greater than 1, C indicates the slice type is equal to B and a number of reference entries in reference picture list 1 is greater than 1, and wherein "&" is logical "and" operation and "∥" is logical "or" operation.

In another example aspect, another video processing method is disclosed. The method includes performing a conversion between a video and a bitstream of the video, wherein the bitstream conforms to a format rule, and wherein the format rule specifies a condition that controls whether or how one or more syntax elements related to picture order counts for a long term reference picture are included in a reference picture list syntax structure in the bitstream.

In another example aspect, another video processing method is disclosed. The method includes performing a conversion between a video and a bitstream of the video, wherein the bitstream conforms to a format rule, wherein the format rule specifies whether a syntax element related to reference pictures in a reference picture list is included in a reference picture list syntax structure.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a bitstream generated according to a method described herein is disclosed. The bitstream may be stored on a computer-readable storage medium.

In yet another example aspect, a computer readable medium having code stored thereon is disclose. The code embodies one of the methods described herein in the form of processor-executable code.

These, and other, features are described throughout the present document.

DETAILED DESCRIPTION

Figure 1:
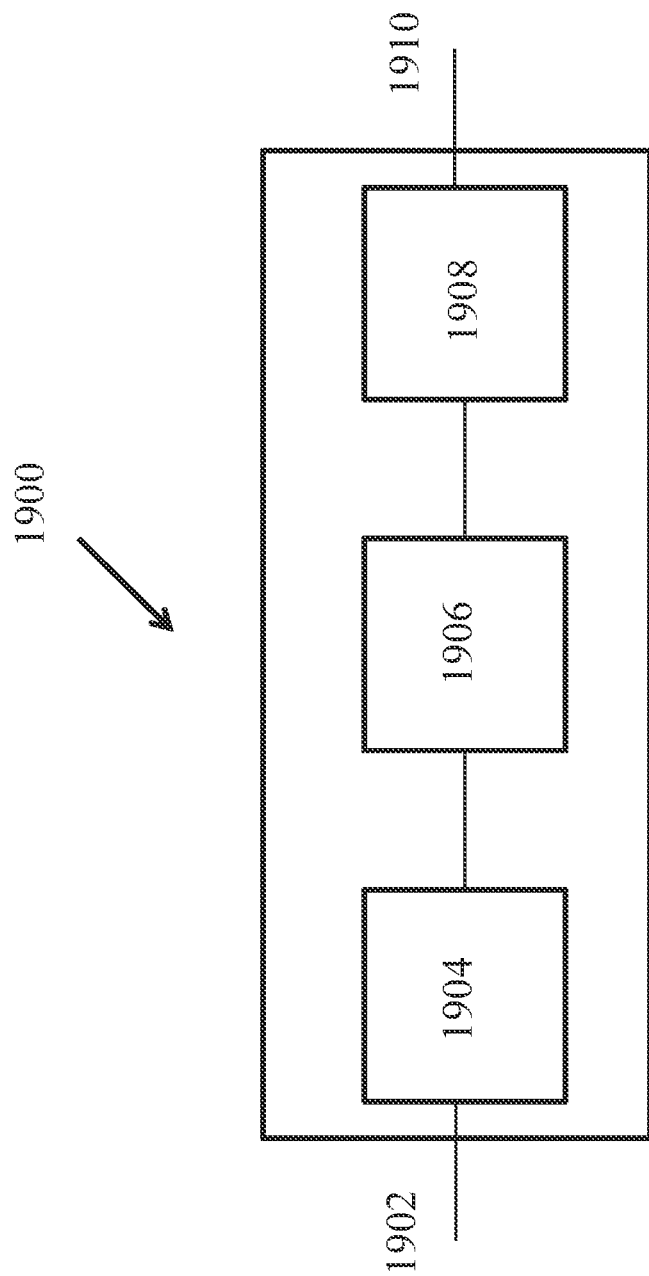
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. INITIAL DISCUSSION

This document is related to video coding technologies. Specifically, it is about the design of PPS, PH, and SH syntax in video coding. The ideas may be applied individually or in various combination, to any video coding standard or non-standard video codec that supports multi-layer video coding, e.g., the being-developed Versatile Video Coding (VVC).

2. ABBREVIATIONS

ALF Adaptive Loop Filter
APS Adaptation Parameter Set
AU Access Unit
AUD Access Unit Delimiter
AVC Advanced Video Coding
CB/Cb Blue Difference Chroma
CLVS Coded Layer Video Sequence
CPB Coded Picture Buffer
CRA Clean Random Access
CR/Cr Red Difference Chroma
CTB Coding Tree Block
CTU Coding Tree Unit
CU Coding Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
ID Identifier
IDR Instantaneous Decoding Refresh
IRAP Intra Random Access Point
JEM Joint Exploration Model
LMCS Luma Mapping With Chroma Scaling
LSB Least Significant Bits
LTRP Long-Term Reference Picture
MCTS Motion-Constrained Tile Sets
MSB Most Significant Bits
MVP Motion Vector Prediction
NAL Network Abstraction Layer
OLS Output Layer Set
PH Picture Header
POC Picture Order Count
PPS Picture Parameter Set
PTL Profile, Tier and Level
PU Picture Unit
QP/Qp Quantization Parameter
RADL Random Access Decodable Leading
RASL Random Access Skipped Leading
RBSP Raw Byte Sequence Payload
RPL Reference Picture List
SAO Sample Adaptive Offset
SEI Supplemental Enhancement Information
SH Slice Header
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding
Y Luminance

3. VIDEO PROCESSING INTRODUCTION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDJS) at the July 2020 meeting.

3.1. PPS Syntax and Semantics

In the latest VVC draft text, the PPS syntax and semantics are as follows:

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num _exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           (tile_idx_delta_present_flag \|\| tileIdx % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |

| | Descriptor |
|---|---|
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag \|\| pps_weighted_bipred_flag ) && rpl_info_in_ph_flag ) | |
|   wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

A PPS RBSP shall be available to the decoding process prior to it being referenced, included in at least one AU with TemporalId less than or equal to the TemporalId of the PPS NAL unit or provided through external means.

All PPS NAL units with a particular value of pps_pic_parameter_set_id within a PU shall have the same content.

pps_pic_parameter_set_id identifies the PPS for reference by other syntax elements. The value of pps_pic_parameter_set_id shall be in the range of 0 to 63, inclusive.

PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

mixed_nalu_types_in_pic_flag equal to 1 specifies that each picture referring to the PPS has more than one VCL NAL unit, the VCL NAL units do not have the same value of nal_unit_type, and the picture is not an IRAP picture.

mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

- The slice shall belong to a subpicture subpicA for which the value of the corresponding subpic_treated_as_pic_flag[i] is equal to 1.
- The slice shall not belong to a subpicture of picA containing VCL NAL units with nal_unit_type not equal to nalUnitTypeA.
- If nalUnitTypeA is equal to CRA, for all the following PUs following the current picture in the CLVS in decoding order and in output order, neither RefPicList[0] nor RefPicList[1] of a slice in subpicA in those PUs shall include any picture preceding picA in decoding order in an active entry.
- Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.
  - NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_flag is equal to 0 and mixed_nalu_types_in_pic_flag is equal to 1, a picture referring to the PPS cannot have slices with nal_unit_type equal to IDR_W_RADL or IDR_N_LP.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When res_change_in_clvs_allowed_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When res_change_in_clvs_allowed_flag equal to 0, the value of pic_height_in_luma_samples shall be equal to pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$PicWidthInCtbsY = Ceil(pic\_width\_in\_luma\_samples + CtbSizeY) \quad (69)$$

$$PicHeightInCtbsY = Ceil(pic\_height\_in\_luma\_samples + CtbSizeY) \quad (70)$$

$$PicSizeInCtbsY = PicWidthInCtbsY * PicHeightInCtbsY \quad (71)$$

$$PicWidthInMinCbsY = pic\_width\_in\_luma\_samples / MinCbSizeY \quad (72)$$

$$PicHeightInMinCbsY = pic\_height\_in\_luma\_samples / MinCbSizeY \quad (73)$$

$$PicSizeInMinCbsY = PicWidthInMinCbsY * PicHeightInMinCbsY \quad (74)$$

$$PicSizeInSamplesY = pic\_width\_in\_luma\_samples * pic\_height\_in\_luma\_samples \quad (75)$$

$$PicWidthInSamplesC = pic\_width\_in\_luma\_samples / SubWidthC \quad (76)$$

$$PicHeightInSamplesC = pic\_height\_in\_luma\_samples / SubHeightC \quad (77)$$

pps_conformance_window_flag equal to 1 indicates that the conformance cropping window offset parameters follow next in the PPS. pps_conformance_window_flag equal to 0 indicates that the conformance cropping window offset parameters are not present in the PPS.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. When pps_conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_luma_samples−(SubWidthC*pps_conf_win_right_offset+1) and vertical picture coordinates from SubHeightC*pps_conf_win_top_offset to pic_height_in_luma_samples−(SubHeightC*pps_conf_win_bottom_offset+1), inclusive.

The value of SubWidthC*(pps_conf_win_left_offset+pps_conf_win_right_offset) shall be less than pic_width_in_luma_samples, and the value of SubHeightC*(pps_conf_win_top_offset+pps_conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x,y) are the picture coordinates of the specified luma samples.

NOTE 2—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag shall be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

pps_num_subpics_minus1 shall be equal to sps_num_subpics_minus1.

pps_subpic_id_len_minus1 shall be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
    if( subpic_id_mapping_explicitly_signalled_flag )
        SubpicIdVal[ i ] = subpic_id_mapping_in_pps_flag ? pps_subpic_id[ i ] : sps_subpic_id[ i ]         (80)
    else
        SubpicIdVal[ i ] = i
```

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

PicOutputWidth$L$=pic_width_in_luma_samples−SubWidth$C$*(scaling_win_right_offset+scaling_win_left_offset)   (78)

PicOutputHeight$L$=pic_height_in_luma_samples−SubWidth$C$*(scaling_win_bottom_offset+scaling_win_top_offset)   (79)

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:

PicOutputWidthL*2 shall be greater than or equal to refPicWidthInLumaSamples.

PicOutputHeightL*2 shall be greater than or equal to refPicHeightInLumaSamples.

PicOutputWidthL shall be less than or equal to refPicWidthInLumaSamples*8.

PicOutputHeightL shall be less than or equal to refPicHeightInLumaSamples*8.

PicOutputWidthL*pic_width_max_in_luma_samples shall be greater than or equal to refPicOutputWidthL*(pic_width_in_luma_samples−Max(8,MinCbSizeY)).

PicOutputHeightL*pic_height_max_in_luma_samples shall be greater than or equal to refPicOutputHeightL*(pic_height_in_luma_samples−Max(8,MinCbSizeY)).

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

It is a requirement of bitstream conformance that both of the following constraints apply:

For any two different values of i and j in the range of 0 to sps_num_subpics_minus1, inclusive, SubpicIdVal[i] shall not be equal to SubpicIdVal[j].

When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i shall be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_colunmn_width_minus1[i] shall be in the range of 0 to PicWidthInCtbsY−1, inclusive. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] shall be in the range of 0 to PicHeightInCtbsY−1, inclusive. When not present, the value of tile_row_height_minus1[0] is inferred to be equal to PicHeightInCtbsY−1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex A. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.

slice_width_in_tiles_minus1[i] plus 1 specifies the width of the i-th rectangular slice in units of tile columns. The value of slice_width_in_tiles_minus1[i] shall be in the range of 0 to NumTileColumns−1, inclusive.

When slice_width_in_files_minus1[i] is not present, the following applies:
   If NumTileColumns is equal to 1, the value of slice_width_in_tiles_minus1[i] is inferred to be equal to 0.
   Otherwise, the value of slice_width_in_tiles_minus1[i] is inferred as specified in clause 6.5.1.

slice_height_in_tiles_minus1[i] plus 1 specifies the height of the i-th rectangular slice in units of tile rows. The value of slice_height_in_tiles_minus1[i] shall be in the range of 0 to NumTileRows−1, inclusive. When slice_height_in_tiles_minus1[i] is not present, the following applies:
   If NumTileRows is equal to 1, or tile_idx_delta_present_flag is equal to 0 and tileIdx % NumTileColumns is greater than 0), the value of slice_height_in_tiles_minus1[i] is inferred to be equal to 0.
   Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] is inferred to be equal to slice_height_in_tiles_minus1[i−1].

num_exp_slices_in_tile[i] specifies the number of explicitly provided slice heights in the current tile that contains more than one rectangular slices. The value of num_exp_slices_in_tile[i] shall be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.

exp_slice_height_in_ctus_minus1[j] plus 1 specifies the height of the j-th rectangular slice in the current tile in units of CTU rows. The value of exp_slice_height_in_ctus_minus1[j] shall be in the range of 0 to RowHeight[tileY]−1, inclusive, where tileY is the tile row index of the current tile.

When num_exp_slices_in_tile[i] is greater than 0, the variable NumSlicesInTile[i] and SliceHeightInCtusMinus1[i+k] for k in the range of 0 to NumSlicesInTile[i]−1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
   SliceHeightInCtusMinus1[ i++ ] = exp_slice_height_in_ctu_minus1[ j ]
   remainingHeightInCtbsY −= SliceHeightInCtusMinus1[ j ]
}                                                                                    (81)
uniformSliceHeightMinus1 = SliceHeightInCtusMinus1[ i − 1 ]
while( remainingHeightInCtbsY >= (uniformSliceHeightMinus1 + 1) ) {
   SliceHeightInCtusMinus1[ i++ ] = uniformSliceHeightMinus1
   remainingHeightInCtbsY −= (uniformSliceHeightMinus1 + 1)
   j++
}
if( remainingHeightInCtbsY > 0 ) {
   SliceHeightInCtusMinus1[ i++ ] = remainingHeightInCtbsY
   j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. When present, the value of tile_idx_delta[i] shall not be equal to 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS.

init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.

cu_qp_delta_enabled_flag equal to 1 specifies that the ph_cu_qp_delta_subdiv_intra_slice and ph_cu_qp_delta_subdiv_inter_slice syntax elements are present in PHs referring to the PPS and cu_qp_delta_abs may be present in the transform unit syntax. cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit syntax.

pps_chroma_tool_offsets_present_flag equal to 1 specifies that chroma tool offsets related syntax elements are present in the PPS RBSP syntax structure. pps_chroma_tool_offsets_present_flag equal to 0 specifies that chroma tool offsets related syntax elements are not present in in the PPS RBSP syntax structure. When ChromaArrayType is equal to 0, the value of pps_chroma_tool_offsets_present_flag shall be equal to 0.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equal to 0.

pps_joint_cbcr_qp_offset_present_flag equal to 1 specifies that pps_joint_cbcr_qp_offset_value and joint_cbcr_qp_offset_list[i] are present in the PPS RBSP syntax structure. pps_joint_cbcr_qp_offset_present_flag equal to 0 specifies that pps_joint_cbcr_qp_offset_value and joint_cbcr_qp_offset_list[i] are not present in the PPS RBSP syntax structure. When ChromaArrayType is equal to 0 or spsjoint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.

pps_joint_cbcr_qp_offset_value specifies the offset to the luma quantization parameter Qp'$_Y$ used for deriving Qp'$_{CbCr}$. The value of pps_joint_cbcr_qp_offset_value shall be in the range of −12 to +12, inclusive. When ChromaArrayType is equal to 0 or spsjoint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the slice_cb_qp_offset and slice_cr_qp_offset syntax elements are present in the associated slice headers. pps_slice_chroma_qp_offsets_present_flag equal to 0 specifies that the slice_cb_qp_offset and slice_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

chroma_qp_offset_list_len_minus1 plus 1 specifies the number of cb_qp_offset_list[i], cr_qp_offset_list[i], and joint_cbcr_qp_offset_list[i], syntax elements that are present in the PPS RBSP syntax structure. The value of chroma_qp_offset_list_len_minus1 shall be in the range of 0 to 5, inclusive.

cb_qp_offset_list[i], cr_qp_offset_list[i], and joint_cbcr_qp_offset_list[i], specify offsets used in the derivation of Qp'$_{Cb}$, Qp'$_{Cr}$, and Qp'$_{CbCr}$, respectively. The values of cb_qp_offset_list[i], cr_qp_offset_list[i], and joint_cbcr_qp_offset_list[i] shall be in the range of −12 to +12, inclusive. When pps_joint_cbcr_qp_offset_present_flag is equal to 0, joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_inph_flag is inferred to be equal to 0.

sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure.

alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY/MinCbSizeY+1 is greater than pic_width_in_luma_samples/MinCbSizeY−1, the value of pps_ref_wraparound_enabled_flag shall be equal to 0. When sps_ref_wraparound_enabled_flag is equal to 0, the value of pps_ref_wraparound_enabled_flag shall be equal to 0.

pps_ref_wraparound_offset plus (CtbSizeY/MinCbSizeY)+2 specifies the offset used for computing the horizontal wrap-around position in units of MinCbSizeY luma samples. The value of pps_ref_wraparound_offset shall be in the range of 0 to (pic_width_in_luma_samples/MinCbSizeY)−(CtbSizeY/MinCbSizeY)−2, inclusive. The variable PpsRefWraparoundOffset is set equal to pps_ref_wraparound_offset+(CtbSizeY/MinCbSizeY)+2.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

3.2. PH Syntax and Semantics

In the latest VVC draft text, the PH syntax and semantics are as follows:

| | Descriptor |
|---|---|
| picture_header_rbsp( ) { | |
|   picture_header_structure( ) | |
|   rbsp_trailing_bits( ) | |
| } | |

The PH RBSP contains a PH syntax structure, i.e., picture_header_structure( ).

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |

-continued

| | Descriptor |
|---|---|
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |

-continued

| | Descriptor |
|---|---|
|     if( ( pps_weighted_pred_flag \|\| pps_weighted_bipred_flag ) && wp_info_in_ph_flag ) | |
|         pred_weight_table( ) | |
|     } | |
|     if( qp_delta_info_in_ph_flag ) | |
|         ph_qp_delta | se(v) |
|     if( sps_joint_cbcr_enabled_flag ) | |
|         ph_joint_cbcr_sign_flag | u(1) |
|     if( sps_sao_enabled_flag && sao_info_in_ph_flag ) { | |
|         ph_sao_luma_enabled_flag | u(1) |
|         if( ChromaArrayType != 0 ) | |
|             ph_sao_chroma_enabled_flag | u(1) |
|     } | |
|     if( sps_dep_quant_enabled_flag ) | |
|         ph_dep_quant_enabled_flag | u(1) |
|     if( sps_sign_data_hiding_enabled_flag && !ph_dep_quant_enabled_flag ) | |
|         pic_sign_data_hiding_enabled_flag | u(1) |
|     if( deblocking_filter_override_enabled_flag && dbf_info_in_ph_flag ) { | |
|         ph_deblocking_filter_override_flag | u(1) |
|         if( ph_deblocking_filter_override_flag ) { | |
|             ph_deblocking_filter_disabled_flag | u(1) |
|             if( !ph_deblocking_filter_disabled_flag ) { | |
|                 ph_beta_offset_div2 | se(v) |
|                 ph_tc_offset_div2 | se(v) |
|                 ph_cb_beta_offset_div2 | se(v) |
|                 ph_cb_tc_offset_div2 | se(v) |
|                 ph_cr_beta_offset_div2 | se(v) |
|                 ph_cr_tc_offset_div2 | se(v) |
|             } | |
|         } | |
|     } | |
|     if( picture_header_extension_present flag ) { | |
|         ph_extension_length | ue(v) |
|         for( i = 0; i < ph_extension_length; i++) | |
|             ph_extension_data_byte[ i ] | u(8) |
|     } | |
| } | |

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 1—For bitstreams that are supposed to work subpicture based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of the ph_pic_order_cnt_lsb shall be in the range of 0 to MaxPicOrderCntLsb−1, inclusive.

no_output_of_prior_pics_flag affects the output of previously-decoded pictures in the DPB after the decoding of a CLVSS picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

When the current picture is a GDR picture, the variable RpPicOrderCntVal is derived as follows:

$$RpPicOrderCntVal=PicOrderCntVal+recovery\_poc\_cnt \qquad (82)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification shall ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag shall be equal to 0.

poc_msb_val specifies the POC MSB value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of ALF APSs that the slices associated with the PH refers to.

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to ph_alf_aps_id_chroma shall be equal to 1.

The TemporalId of the APS NAL unit having aps_params_type equal to ALF_APS and adaptation_parameter_set_id equal to ph_alf_aps_id_chroma shall be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF APS that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id shall be equal to 1.

The TemporalId of the APS NAL unit having aps_params_type equal to ALF_APS and adaptation_parameter_set_id equal to ph_cc_alf_cb_aps_id shall be less than or equal to the TemporalId of the picture associated with the PH.

ph_cc_alf_cr_enabled_flag equal to 1 specifies that cross-component filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr_aps_id shall be equal to 1.

The TemporalId of the APS NAL unit having aps_params_type equal to ALF_APS and adaptation_parameter_set_id equal to ph_cc_alf_cr_aps_id shall be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

It is a requirement of bitstream conformance that, when subpic_info_present_flag is equal to 1, the value of ph_virtual_boundaries_present_flag shall be equal to 0.

The variable VirtualBoundariesPresentFlag is derived as follows:

VirtualBoundariesPresentFlag=0 if(sps_virtual_
boundaries_enabled_flag)
VirtualBoundariesPresentFlag=sps_virtual_boundaries_
present_flag||ph_virtual_boundaries_present_flag  (83)

ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable NumVerVirtualBoundaries is derived as follows:

NumVerVirtualBoundaries=0 if(sps_virtual_boundaries_enabled_flag)
NumVerVirtualBoundaries=sps_virtual_boundaries_present_
flag?sps_num_ver_virtual_boundaries:
ph_num_ver_virtual_boundaries  (84)

ph_virtual_boundaries_pos_x[i] specifies the location of the i-th vertical virtual boundary in units of luma samples divided by 8. The value of ph_virtual_boundaries_pos_x[i] shall be in the range of 1 to Ceil(pic_width_in_luma_samples+8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

for(i=0;i<NumVerVirtualBoundaries;i++)Virtual-
BoundariesPosX[i]=(sps_virtual_boundaries_pre-
sent_flag?sps_virtual_boundaries_pos_x[i]:ph_
virtual_boundaries_pos_x[i])*8  (85)

The distance between any two vertical virtual boundaries shall be greater than or equal to CtbSizeY luma samples.

ph_num_hor_virtual_boundaries specifies the number of ph_virtual_boundaries_pos_y[i] syntax elements that are present in the PH. When ph_num_hor_virtual_boundaries is not present, it is inferred to be equal to 0.

The parameter NumHorVirtualBoundaries is derived as follows:

NumHorVirtualBoundaries=0 if(sps_virtual_boundaries_enabled_flag)
NumHorVirtualBoundaries=sps_virtual_boundaries_present_
flag?sps_num_hor_virtual_boundaries:ph_num_
hor_virtual_boundaries  (86)

When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0.

ph_virtual_boundaries_pos_y[i] specifies the location of the i-th horizontal virtual boundary in units of luma samples divided by 8. The value of ph_virtual_boundaries_pos_y[i] shall be in the range of 1 to Ceil(pic_height_in_luma_samples+8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

for(i=0;i<NumHorVirtualBoundaries;i++)Virtual-
BoundariesPosY[i]=(sps_virtual_boundaries_pre-
sent_flag?sps_virtual_boundaries_pos_y[i]:ph_
virtual_boundaries_pos_y[i])*8  (87)

The distance between any two horizontal virtual boundaries shall be greater than or equal to CtbSizeY luma samples.

pic_output_flag affects the decoded picture output and removal processes as specified in Annex C. When pic_output_flag is not present, it is inferred to be equal to 1.

partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.

ph_log2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log2_diff_min_qt_min_cb_intra_slice_luma shall be in the range of 0 to CtbLog2SizeY−MinCbLog2SizeY, inclusive. When not present, the value of ph_log2_diff_min_qt_min_cb_luma is inferred to be equal to sps_log2_diff_min_qt_min_cb_intra_slice_luma.

ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma shall be in the range of 0 to 2*(CtbLog2SizeY−MinCbLog2SizeY), inclusive. When not present, the value of ph_max_mtt_hierarchy_depth_intra_slice_luma is inferred to be equal to sps_max_mtt_hierarchy_depth_intra_slice_luma.

ph_log2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log2_diff_max_bt_min_qt_intra_slice_luma shall be in the range of 0 to CtbLog2SizeY−MinQtLog2SizeIntraY, inclusive. When not present, the value of ph_log2_diff_max_bt_min_qt_intra_slice_luma is inferred to be equal to sps_log2_diff_max_bt_min_qt_intra_slice_luma.

ph_log2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log2_diff_max_tt_min_qt_intra_slice_luma shall be in the range of 0 to CtbLog2SizeY−MinQtLog2SizeIntraY, inclusive. When not present, the value of ph_log 2diff_max_tt_min_qt_intra_slice_luma is inferred to be equal to sps_log2_diff_max_tt_min_qt_intra_slice_luma.

ph_log2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log2_diff_min_qt_min_cb_intra_slice_chroma shall be in the range of 0 to CtbLog2SizeY−MinCbLog2SizeY, inclusive. When not present, the value of ph_log2_diff_min_qt_min_cb_intra_slice_chroma is inferred to be equal to sps_log2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma shall be in the range of 0 to 2*(CtbLog2SizeY−MinCbLog2SizeY), inclusive. When not present, the value of ph_max_mtt_hierarchy_depth_intra_slice_chroma is inferred to be equal to sps_max_mtt_hierarchy_depth_intra_slice_chroma.

ph_log2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log2_diff_max_bt_min_qt_intra_slice_chroma shall be in the range of 0 to CtbLog2SizeY−MinQtLog2SizeIntraC, inclusive. When not present, the value of ph_log2_diff_max_bt_min_qt_intra_slice_chroma is inferred to be equal to sps_log2_diff_max_bt_min_qt_intra_slice_chroma.

ph_log2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log2_diff_max_tt_min_qt_intra_slice_chroma shall be in the range of 0 to CtbLog2SizeY−MinQtLog2SizeIntraC, inclusive. When not present, the value of ph_log2_diff_max_tt_min_qt_intra_slice_chroma is inferred to be equal to sps_log2_diff_max_tt_min_qt_intra_slice_chroma.

ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to 2*(CtbLog2SizeY−MinQtLog2SizeIntraY+ph_max_mtt_hierarchy_depth_intra_slice_luma), inclusive. When not present, the value of ph_cu_qp_delta_subdiv_intra_slice is inferred to be equal to 0. ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to 2*(CtbLog2SizeY−MinQtLog2SizeIntraY+ph_max_mtt_hierarchy_depth_intra_slice_luma), inclusive. When not present, the value of ph_cu_chroma_qp_offset_subdiv_intra_slice is inferred to be equal to 0.

ph_log2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log2_diff_min_qt_min_cb_inter_slice shall be in the range of 0 to CtbLog2SizeY−MinCbLog2SizeY, inclusive. When not present, the value of ph_log2_diff_min_qt_min_cb_luma is inferred to be equal to sps_log2_diff_min_qt_min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*(CtbLog2SizeY−MinCbLog2SizeY), inclusive. When not present, the value of ph_max_mtt_hierarchy_depth_inter_slice is inferred to be equal to sps_max_mtt_hierarchy_depth_inter_slice.

ph_log2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log2_diff_max_bt_min_qt_inter_slice shall be in the range of 0 to CtbLog2SizeY−MinQtLog2SizeInterY, inclusive. When not present, the value of ph_log2_diff_max_bt_min_qt_inter_slice is inferred to be equal to sps_log2_diff_max_bt_min_qt_inter_slice.

ph_log2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log2_diff_max_tt_min_qt_inter_slice shall be in the range of 0 to CtbLog2SizeY−MinQtLog2SizeInterY, inclusive. When not present, the value of ph_log2_diff_max_tt_min_qt_inter_slice is inferred to be equal to sps_log2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to 2*(CtbLog2SizeY−MinQtLog2SizeInterY+ ph_max_mtt_hierarchy_depth_inter_slice), inclusive. When not present, the value of ph_cu_qp_delta_subdiv_inter_slice is inferred to be equal to 0.

ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to 2*(CtbLog2SizeY−MinQtLog2SizeInterY+ ph_max_mtt_hierarchy_depth_inter_slice), inclusive. When not present, the value of ph_cu_chroma_qp_offset_subdiv_inter_slice is inferred to be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. The maximum number of subblock-based merging MVP candidates, MaxNumSubblockMergeCand, is derived as follows:

```
if( sps_affine_enabled_flag )
    MaxNumSubblockMergeCand = 5 − five_minus_max_num_subblock_merge_cand            (88)
else
    MaxNumSubblockMergeCand = sps_sbtmvp_enabled_flag && ph_temporal_mvp_enable_flag
```

The value of MaxNumSubblockMergeCand shall be in the range of 0 to 5, inclusive.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to num_ref_entries[0][RplsIdx[0]]−1, inclusive.

When ph_collocated_from_l0_flag is equal to 0, ph_collocated_ref_idx refers to an entry in reference picture list 1, and the value of ph_collocated_ref_idx shall be in the range of 0 to num_ref_entries[1][RplsIdx[1]]−1, inclusive.

When not present, the value of ph_collocated_ref_idx is inferred to be equal to 0.

mvd_l1_zero_flag equal to 1 indicates that the mvd_coding(x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. mvd_l1_zero_flag equal to 0 indicates that the mvd_coding(x0, y0, 1) syntax structure is parsed.

ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:
  If sps_bdof_enabled_flag is equal to 1, the value of ph_disable_bdof_flag is inferred to be equal to 0.
  Otherwise (sps_bdof_enabled_flag is equal to 0), the value of ph_disable_bdof_flag is inferred to be equal to 1.

ph_disable_dmvr_flag equal to 1 specifies that decoder motion vector refinement based inter bi-prediction is disabled in the slices associated with the PH. ph_disable_dmvr_ flag equal to 0 specifies that decoder motion vector refinement based inter bi-prediction may or may not be enabled in the slices associated with the PH.

When ph_disable_dmvr_flag is not present, the following applies:
  If sps_dmvr_enabled_flag is equal to 1, the value of ph_disable_dmvr_flag is inferred to be equal to 0.
  Otherwise (sps_dmvr_enabled_flag is equal to 0), the value of ph_disable_dmvr_flag is inferred to be equal to 1.

ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH.

When ph_disable_prof_flag is not present, the following applies:
  If sps_affine_prof_enabled_flag is equal to 1, the value of ph_disable_prof_flag is inferred to be equal to 0.
  Otherwise (sps_affine_prof_enabled_flag is equal to 0), the value of ph_disable_prof_flag is inferred to be equal to 1.

ph_qp_delta specifies the initial value of $Qp_Y$ to be used for the coding blocks in the picture until modified by the value of CuQpDeltaVal in the coding unit layer.

When qp_delta_info_in_ph_flag is equal to 1, the initial value of the $Qp_Y$ quantization parameter for all slices of the picture, $SliceQp_Y$, is derived as follows:

$$SliceQp_Y = 26 + \text{init\_qp\_minus26} + \text{ph\_qp\_delta} \qquad (89)$$

The value of $SliceQp_Y$ shall be in the range of −QpBdOffset to +63, inclusive.

ph_joint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.

ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.

ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.

ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length shall be in the range of 0 to 256, inclusive. When not present, the value of ph_extension_length is inferred to be equal to 0.

ph_extension_data_byte may have any value. Decoders conforming to this version of this Specification shall ignore the value of ph_extension_data_byte. Its value does not affect decoder conformance to profiles specified in this version of specification.

3.3. SH Syntax and Semantics

In the latest VVC draft text, the SH syntax and semantics are as follows:

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( (rect_slice_flag && NumSlicesInSubpic[ CurrSubpicIdx ] > 1 )   \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |

-continued

| | Descriptor |
|---|---|
| slice_alf_chroma_idc | u(2) |
| if( slice_alf_chroma_idc ) | |
|   slice_alf_aps_id_chroma | u(3) |
| if( sps_ccalf_enabled_flag ) { | |
|   slice_cc_alf_cb_enabled_flag | u(1) |
|   if( slice_cc_alf_cb_enabled_flag ) | |
|     slice_cc_alf_cb_aps_id | u(3) |
|   slice_cc_alf_cr_enabled_flag | u(1) |
|   if( slice_cc_alf_cr_enabled_flag ) | |
|     slice_cc_alf_cr_aps_id | u(3) |
|   } | |
| } | |
| } | |
| if( separate_colour_plane_flag == 1 ) | |
|   colour_plane_id | u(2) |
| if( !rpl_info_in_ph_flag && ( ( nal_unit_type != IDR_W_RADL && nal_unit_type != IDR_N_LP )  \|\|  sps_idr_rpl_present_flag ) ) | |
|   ref_pic_lists( ) | |
| if( ( rpl_info_in_ph_flag  \|\|  ( ( nal_unit_type != IDR_W_RADL && nal_unit_type != IDR_N_LP )  \|\|  sps_idr_rpl_present_flag ) ) && | |
|   ( slice_type != I && num_ref_entries[ 0 ][ RplsIdx[ 0 ] ] > 1 )  \|\|  | |
|   ( slice_type == B && num_ref_entries[ 1 ][ RplsIdx[ 1 ] ] > 1 ) ) { | |
|   num_ref_idx_active_override_flag | u(1) |
|   if( num_ref_idx_active_override_flag ) | |
|     for( i = 0; i < ( slice_type == B ? 2: 1); i++ ) | |
|       if( num_ref_entries[ i ][ RplsIdx[ i ] ] > 1 ) | |
|         num_ref_idx_active_minus1[ i ] | ue(v) |
| } | |
| if( slice_type != I ) { | |
|   if( cabac_init_present_flag ) | |
|     cabac_init_flag | u(1) |
|   if( ph_temporal_mvp_enabled_flag && !rpl_info_in_ph_flag ) { | |
|     if( slice_type == B ) | |
|       slice_collocated_from_l0_flag | u(1) |
|     if( ( slice_collocated_from_l0_flag && NumRefIdxActive[ 0 ] > 1 )  \|\|  | |
|       ( ! slice_collocated_from_l0_flag && NumRefIdxActive[ 1 ] > 1 ) ) | |
|       slice_collocated_ref_idx | ue(v) |
|   } | |
|   if( !wp_info_in_ph_flag && ( ( pps_weighted_pred_flag && slice_type == P )  \|\|  | |
|     ( pps_weighted_bipred_flag && slice_type == B ) ) ) | |
|     pred_weight_table( ) | |
| } | |
| if( !qp_delta_info_in_ph_flag ) | |
|   slice_qp_delta | se(v) |
| if( pps_slice_chroma_qp_offsets_present_flag ) { | |
|   slice_cb_qp_offset | se(v) |
|   slice_cr_qp_offset | se(v) |
|   if( sps_joint_cbcr_enabled_flag ) | |
|     slice_joint_cbcr_qp_offset | se(v) |
| } | |
| if( pps_cu_chroma_qp_offset_list_enabled_flag ) | |
|   cu_chroma_qp_offset_enabled_flag | u(1) |
| if( sps_sao_enabled_flag && !sao_info_in_ph_flag ) { | |
|   slice_sao_luma_flag | u(1) |
|   if( ChromaArrayType != 0 ) | |
|     slice_sao_chroma_flag | u(1) |
| } | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } | |
| } | |
| slice_ts_residual_coding_disabled_flag | u(1) |
| if( ph_lmcs_enabled_flag ) | |
|   slice_lmcs_enabled_flag | u(1) |
| if( ph_scaling_list_enabled_flag ) | |
|   slice_scaling_list_present_flag | u(1) |
| if( NumEntryPoints > 0 ) { | |

| | Descriptor |
|---|---|
| offset_len_minus1 | ue(v) |
|     for( i = 0; i < NumEntryPoints; i++ ) | |
|         entry_point_offset_minus1[ i ] | u(v) |
| } | |
| if( slice_header_extension_present_flag ) { | |
|     slice_header_extension_length | ue(v) |
|     for( i = 0; i < slice_header_extension_length; i++) | |
|         slice_header_extension_data_byte[ i ] | u(8) |
| } | |
| byte_alignment( ) | |
| } | |

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$, quantization parameters for the coding unit containing cu_chroma_qp_offset_flag, are all set equal to 0.

picture_header_in_slice_header_flag equal to 1 specifies that the PH syntax structure is present in the slice header, picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:

The slice address is the raster scan tile index.

The length of slice_address is Ceil(Log2(NumTilesInPic)) bits.

The value of slice_address shall be in the range of 0 to NumTilesInPic−1, inclusive.

Otherwise (rect_slice_flag is equal to 1), the following applies:

The slice address is the subpicture-level slice index of the slice.

The length of slice_address is Ceil(Log2(NumSlicesInSubpic[CurrSubpicIdx])) bits.

The value of slice_address shall be in the range of 0 to NumSlicesInSubpic[CurrSubpicIdx]−1, inclusive.

It is a requirement of bitstream conformance that the following constraints apply:

If rect_slice_flag is equal to 0 or subpic_info_present_flag is equal to 0, the value of slice_address shall not be equal to the value of slice_address of any other coded slice NAL unit of the same coded picture.

Otherwise, the pair of slice_subpic_id and slice_address values shall not be equal to the pair of slice_subpic_id and slice_address values of any other coded slice NAL unit of the same coded picture.

The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ] [ i ]          (117)
} else {
    NumCtusInCurrSlice = 0
    for( tileIdx = slice_address; tileIdx <= slice_address + num_tiles_in_slice_minus1; tileIdx++ ) {
```

```
    tileX = tileIdx % NumTileColumns
    tileY = tileIdx / NumTileColumns
    for( ctbY = tileRowBd[ tileY ]; ctbY < tileRowBd[ tileY + 1 ]; ctbY++ ) {
      for( ctbX = tileColBd[ tileX ]; ctbX < tileColBd[ tileX + 1 ]; ctbX++ ) {
        CtbAddrInCurrSlice[ NumCtusInCurrSlice ] = ctbY * PicWidthInCtb + ctbX
        NumCtusInCurrSlice++
      }
    }
   }
  }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
  SubpicLeftBoundaryPos = subpic_ctu_top_left_x[ CurrSubpicIdx ] * CtbSizeY
  SubpicRightBoundaryPos = Min( pic_width_max_in_luma_samples - 1,
    ( subpic_ctu_top_left_x[ CurrSubpicIdx ] +
    subpic_width_minus1[ CurrSubpicIdx ] + 1 ) * CtbSizeY - 1 )
  SubpicTopBoundaryPos = subpic_ctu_top_left_y[ CurrSubpicIdx ] *CtbSizeY
  SubpicBotBoundaryPos = Min( pic_height_max_in_luma_samples - 1,
    ( subpic_ctu_top_left_y[ CurrSubpicIdx ] +
    subpic_height_minus1[ CurrSubpicIdx ] + 1 ) * CtbSizeY - 1 )
}
```
(118)

slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

If slice_type equal to 2 (I), the following applies:

MinQtLog2SizeY=MinCbLog2SizeY+ ph_log2_diff_min_qt_min_cb_intra_slice_luma (119)

MinQtLog2SizeC=MinCbLog2SizeY+ ph_log2_diff_min_qt_min_cb_intra_slice_chroma (120)

MaxBtSizeY=1<<(MinQtLog2SizeY+ ph_log2_diff_max_bt_min_qt_intra_slice_luma) (121)

MaxBtSizeC=1<<(MinQtLog2SizeC+ ph_log2_diff_max_bt_min_qt_intra_slice_chroma) (122)

MaxTtSizeY=1<<(MinQtLog2SizeY+ ph_log2_diff_max_tt_min_qt_intra_slice_luma) (123)

MaxTtSizeC=1<<(MinQtLog2SizeC+ ph_log_2_diff_max_tt_min_qt_intra_slice_chroma) (124)

MaxMttDepthY=ph_max_mtt_hierarchy_depth_intra_slice_luma (125)

MaxMttDepthC=ph_max_mtt_hierarchy_depth_intra_slice_chroma (126)

CuQpDeltaSubdiv=ph_cu_qp_delta_subdiv_intra_slice (127)

CuChromaQpOffsetSubdiv=ph_cu_chroma_qp_offset_subdiv_intra_slice (128)

Otherwise (slice_type equal to 0 (B) or 1 (P)), the following applies:

MinQtLog2SizeY=MinCbLog2SizeY+ ph_log2_diff_min_qt_min_cb_inter_slice (129)

MinQtLog2SizeC=MinCbLog2SizeY+ ph_log2_diff_min_qt_min_cb_inter_slice (130)

MaxBtSizeY=1<<(MinQtLog2SizeY+ ph_log_2_diff_max_bt_min_qt_inter_slice) (131)

MaxBtSizeC=1<<(MinQtLog2SizeC+ ph_log2_diff_max_bt_min_qt_inter_slice) (132)

MaxTtSizeY=1<<(MinQtLog2SizeY+ ph_log2_diff_max_tt_min_qt_inter_slice) (133)

MaxTtSizeC=1<<(MinQtLog2SizeC+ ph_log_2_diff_max_tt_min_qt_inter_slice) (134)

MaxMttDepthY=ph_max_mtt_hierarchy_depth_inter_slice (135)

MaxMttDepthC=ph_max_mtt_hierarchy_depth_inter_slice (136)

CuQpDeltaSubdiv=ph_cu_qp_delta_subdiv_inter_slice (137)

CuChromaQpOffsetSubdiv=ph_cu_chroma_qp_offset_subdiv_inter_slice (138)

The following applies:

$$\text{MinQtSize}Y = 1 << \text{MinQtLog2Size}Y \quad (139)$$

$$\text{MinQtSize}C = 1 << \text{MinQtLog2Size}C \quad (140)$$

$$\text{MinBtSize}Y = 1 << \text{MinCbLog2Size}Y \quad (141)$$

$$\text{MinTtSize}Y = 1 << \text{MinCbLog2Size}Y \quad (142)$$

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_ parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The value of alf_luma_filter_signal_flag of the APS NAL unit having aps_params_type equal to ALF_APS and adaptation_parameter_set_id equal to slice_alf_aps_id_luma[i] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_ parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id shall be equal to 1.

slice_cc_alf_cr_enabled_flag equal to 0 specifies that the cross-component filter is not applied to the Cr colour component. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id shall be equal to 1.

colour_plane_id identifies the colour plane associated with the current slice when separate_colour_plane_flag is equal to 1. The value of colour_plane_id shall be in the range of 0 to 2, inclusive. colour_plane_id values 0, 1 and 2 correspond to the Y, Cb and Cr planes, respectively. The value 3 of colour_plane_id is reserved for future use by ITU-T|ISO/IEC.

NOTE 1—There is no dependency between the decoding processes of different colour planes of one picture.

num_ref_idx_active_override_flag equal to 1 specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 143. The value of num_ref_idx_active_minus1[i] shall be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0. When the current slice is a P slice, num_ref_idx_active_override_flag is equal to 1, and num_ref_idx_active_minus1[0] is not present, num_ref_idx_active_minus1[0] is inferred to be equal to 0. The variable NumRefIdxActive[i] is derived as follows:

```
for( i = 0; i < 2; i++ ) {
   if( slice_type = = B || ( slice_type = = P && i = = 0 ) ) {
      if( num_ref_idx_active_override_flag )
         NumRefIdxActive[ i ] = num_ref_idx_active_minus1[ i ] + 1                    (143)
      else {
         if( num_ref_entries[ i ][ RplsIdx[ i ] ] >= num_ref_idx_default_active_minus1[ i ] + 1 )
            NumRefIdxActive[ i ] = num_ref_idx_default_active_minus1[ i ] + 1
         else
            NumRefIdxActive[ i ] = num_ref_entries[ i ][ RplsIdx[ i ] ]
      }
   } else /* slice_type = = I || ( slice_type = = P && i = = 1 ) */
      NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

cabac_init_flag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
   If rpl_info_in_ph_flag is equal to 1, slice_collocated_from_l0_flag is inferred to be equal to ph_collocated_from_l0_flag.
   Otherwise (rpl_info_in_ph_flag is equal to 0 and slice_type is equal to P), the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]−1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]−1, inclusive.

When slice_collocated_ref_idx is not present, the following applies:
   If rpl_info_in_ph_flag is equal to 1, the value of slice_collocated_ref_idx is inferred to be equal to ph_collocated_ref_idx.
   Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag?0:1][slice_collocated_ref_idx] shall be equal to 0.

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y = 26 + init\_qp\_minus26 + slice\_qp\_delta \quad (144)$$

The value of $SliceQp_Y$ shall be in the range of −QpBdOffset to +63, inclusive.

When either of the following conditions is true:
   The value of wp_info_in_ph_flag is equal to 1, pps_weighted_pred_flag is equal to 1, and slice_type is equal to P.
   The value of wp_info_in_ph_flag is equal to 1, pps_weighted_bipred_flag is equal to 1, and slice_type is equal to B.
   the following applies:
   The value of NumRefIdxActive[0] shall be less than or equal to the value of NumWeightsL0.
   For each reference picture index RefPicList[0][i] for i in the range of 0 to NumRefIdxActive[0]−1, inclusive, the luma weight, Cb weight, and Cr weight that apply to the reference picture index are LumaWeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:
   The value of NumRefIdxActive[1] shall be less than or equal to the value of NumWeightsL1.
   For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive.

When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive.

When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value+slice_joint_cbcr_qp_offset shall be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0.

The variable NumEntryPoints, which specifies the number of entry points in the current slice, is derived as follows:

```
NumEntryPoints = 0
for( i = 1; i < NumCtusInCurrSlice; i++ ) {
    ctbAddrX = CtbAddrInCurrSlice[ i ] % PicWidthInCtbsY
    ctbAddrY = CtbAddrInCurrSlice[ i ] / PicWidthInCtbsY
    (145) prevCtbAddrX = CtbAddrInCurrSlice[ i − 1 ] % PicWidthInCtbsY
    prevCtbAddrY = CtbAddrInCurrSlice[ i − 1 ] / PicWidthInCtbsY
    if( CtbToTileRowBd[ ctbAddrY ] != CtbToTileRowBd[ prevCtbAddrY ] ||
        CtbToTileColBd[ ctbAddrX ] != CtbToTileColBd[ prevCtbAddrX ] ||
          ( ctbAddrY != prevCtbAddrY && sps_wpp_entry_point_offsets_present_flag ) )
            NumEntryPoints++
}
``` offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_ minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$\text{firstByte}[k] = \Sigma_{n=1}^{k}(\text{entry\_point\_offset\_minus1}[n-1]+1) \quad (146)$$

$$\text{lastByte}[k] = \text{firstByte}[k] + \text{entry\_point\_offset\_minus1}[k] \quad (147)$$

The last subset (with subset index equal to NumEntryPoints) consists of the remaining bytes of the coded slice data. When sps_entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice.

When sps_entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

slice_header_extension_length specifies the length of the slice header extension data in bytes, not including the bits used for signalling slice_header_extension_length itself. The value of slice_header_extension_length shall be in the range of 0 to 256, inclusive. When not present, the value of slice_header_extension_length is inferred to be equal to 0.

slice_header_extension_data_byte[i] may have any value. Decoders conforming to this version of this Specification shall ignore the values of all the slice_header_extension_data_byte[i] syntax elements. Its value does not affect decoder conformance to profiles specified in this version of specification.

4. EXAMPLES OF TECHNICAL PROBLEMS SOLVED

The existing designs for PPS, PH, and SH syntax have the following problems:

1) According to the latest VVC draft text, for any picture in a CLVS, if the PH syntax structure is included in the SH instead of in a PH NAL unit, then each picture in the CLVS has only one slice and the PH syntax structure for each picture in the CLVS is included in the SH instead of in a PH NAL unit. In this case, the signalling of the six PPS flags rpl_info_in_ph_flag, dbf_info_in_ph_flag, sao_info_in_ph_flag, alf_info_in_ph_flag, wp_info_in_ph_flag, and qp_delta_info_in_ph_flag in the PPSs referenced by pictures in the CLVS is not useful.
2) According to the latest VVC draft text, the syntax element num_ref_idx_active_override_flag in the SH syntax is signalled when the condition "A & B∥C" are met, in which "A" indicates "rpl_info_in_ph_flag is equal to 1, or NAL unit type is not IDR, or sps_idr_rpl_present_flag is equal to 1", "B" indicates "slice_type is equal to P or B, and the number of reference entries in reference picture list 0 is greater than 1", and "C" indicates "slice_type is equal to B and the number of reference entries in reference picture list 1 is greater than 1". In this case, when rpl_info_inph_flag is equal to 0, NAL unit type is IDR, and sps_idr_rpl_present_flag is equal to 0, but in the meanwhile, slice_type is equal to B and the number of reference entries in list 1 is greater than 1, the parameters about num_ref_idx_active_minus1[0] and num_ref_idx_active_minus1[1] may still be overridden and set to certain numbers; this may result in an unexpected decoder behavior, including decoder crash.
3) The syntax structure ref_pic_list_struct( ) can be included in SPS and/or PH or SH. When a ref_pic_list_struct( ) is included in PH or SH and long_term_ref_pics_flag is equal to 1, a syntax element ltrp_in_header_flag[ ][ ] would be signaled in the ref_pic_list_struct( ) to indicate whether the picture order count values for the LTRP entries are signaled in the ref_pic_list_struct( ) in PH/SH, by the syntax elements rpls_poc_lsb_lt[ ][ ][ ], or directly signaled in the ref_pic_lists( ) in PH or SH, by the syntax elements poc_lsb_lt[ ][ ]. However, in this case, the signaling of ltrp_in_header_flag in the ref_pic_list_struct( ) is meaningless, as the LTRP POC information would be signalled in the picture header instead of the SPS anyway.
4) The syntax structure ref_pic_lists( ) would be included in either PH or SH. When ref_pic_lists( ) is included in SH, reference picture info of both reference picture lists 0 and reference picture list 1 are always signaled, even if slice_type is equal to P. In this case (when ref_pic_lists( ) is included in SH and slice_type=P), the signaling of reference picture list 1 reference info (e.g., rpl_sps_flag[1], rpl_idx[1], poc_lsb_lt[1][j], delta_poc_msb_present_flag[1][j], delta_poc_msb_cycle_lt[1][j] in which j is in the range of 0 to NumLtrpEntries[1][RplsIdx[1]]−1, inclusive) in ref_pic_lists( ) for P slice become useless.

5. EXAMPLE TECHNIQUES AND EMBODIMENTS

To solve the above problems and some other problems not mentioned, methods as summarized in the listing below are disclosed. The items should be considered as examples to explain the general concepts and should not be interpreted in a narrow way. Furthermore, these items can be applied individually or combined in any manner.

1. To solve the first problem, whether to signal an indication of certain information should be present in either PH or SH (e.g., i.e., rpl_info_in_ph_flag, dbf_info_in_ph_flag, sao_info_in_ph_flag, alf_info_in_ph_flag, wp_info_in_ph_flag, and qp_delta_info_in_ph_flag in PPSs) and/or the presence of picture header syntax structure in slice header (e.g., picture_header_in_slice_header_flag) may depend on an indication of whether each picture in a CLVS has only one slice.
    1) When there is an indication of each picture in a CLVS having only one slice, the indications (e.g., one or more of the 6 PPS flags) on certain information being present in either PH or SH do not need to be signalled for the CLVS wherein each picture has only one slice, as in this case the PH is in the SH.
  a. In one example, an indication of whether each picture referring to the PPS has only one slice may be signalled in PPS.
    i. Alternatively, an indication of whether each picture referring to the PPS has only one intra slice may be signalled in PPS.
    ii. Alternatively, an indicator of whether each picture referring to the PPS has only one inter slice may be signalled in PPS.
  b. In one example, the indication may be a flag, e.g., named pps_one_slice_per_picture_flag, in the PPS. Alternatively, furthermore, this flag equal to 1 specifies that each picture referring to the PPS has only one slice, and this flag equal to 0 specifies that each picture referring to the PPS has one or more slices.
    i. Alternatively, the indication may not be signaled but be inferred from the slice partitioning information signaled, such as the PPS syntax element num_slices_in_pic_minus1 being equal to 0 (either signaled or inferred, in either case the value of rect_slice_flag would be equal to 1, because when rect_slice_flag is equal to 0, num_slices_in_pic_minus1 is not signaled and the value is not inferred either). Therefore, when rect_slice_flag is equal to 1, pps_one_slice_per_picture_flag equal to 1 is equivalent to num_slices_in_pic_minus1 is equal to 0. The shortcoming of this alternative approach is that it does not cover the case when rect_slice_flag is equal to 0, while the approach using the pps_one_slice_per_picture_flag is that applies both cases of rect_slice_flag equal to 0 and rect_slice_flag equal to 1.
    ii. In one example, additionally, the value of pps_one_slice_per_picture_flag is required to be equal to 0 when sps_num_subpics_minus1 is greater than 0.
    iii. Additionally, this flag may be required to be the same for all PPSs referenced by pictures in a CLVS.
    iv. Additionally, this flag may be required to be equal to 1 when the value of one_slice_per_pic_constraint_flag is equal to 1.
    v. Additionally, the semantics of one_slice_per_pic_constraint_flag is updated by adding that one_slice_per_pic_constraint_flag equal to 1 also specifies that pps_one_slice_per_picture_flag shall be equal to 1.
    vi. The signalling of this flag in the PPS may be skipped when it is known from the PPS that there is only one subpicture in each picture (e.g., sps_num_subpics_minus1 being 0) and each subpicture contains only one slice (in this case it would be known that each picture contains only one slice).
  c. When the indication indicates that each picture contains only one slice (e.g., pps_one_slice_per_picture_flag is equal to 1), the signalling of the indications (e.g., the 6 PPS flags) on certain information being present in either PH or SH may be skipped.
    i. Additionally, when pps_one_slice_per_picture_flag is equal to 1, the values of the 6 flags are all inferred to be equal to 0.

Note that inferring them to be 0 is better (than inferring them to be equal to 1) for at least some parameters, e.g., those related to RPL like collocated picture and weighted prediction parameters, as the numbers of active entries would known for their signalling, and knowing this can make the signalling more optimal.
    1. Alternatively, additionally, when pps_one_slice_per_picture_flag is equal to 1, the values of the 6 flags are all inferred to be equal to 1.
    2. Alternatively, when pps_one_slice_per_picture_flag is equal to 1, additionally, the value of each the 6 flags excluding wp_info_in_ph_flag is inferred to be equal to either 1 or 0, regardless of how the other flags are inferred, and for wp_info_in_ph_flag, the value is inferred to be equal to 0 when rpl_info_in_ph_flag is equal to 0, and is inferred to be either 1 or 0 when rpl_info_in_ph_flag is equal to 1, regardless of the values of the other 4 of the 6 flags.
  d. When the indication indicates that each picture contains only one slice (e.g., pps_one_slice_per_picture_flag is equal to 1), the signalling of picture_header_in_slice_header_flag in the SH syntax may be skipped, e.g., by conditioning the syntax element on "if(!pps_one_slice_per_picture_flag)" and inferring the value of picture_header_in_slice_header_flag when pps_one_slice_per_picture_flag is equal to 1.
  e. When pps_one_slice_per_picture_flag is equal to 1, the signalling of slice_address in the SH syntax may be skipped as follows (the added parts are Italic and underlined):

| if( ( rect_slice_flag && NumSlicesInSubpic[ CurrSubpicIdx ] > 1 ) \|\| |  |
| --- | --- |
|     ( !rect_slice_flag && NumTilesInPic > 1 _&&_ |  |
|     _!pps_one_slice_per_picture_flag_ ) |  |
|     slice_address | u(v) |

And the following inference is as added: When rect_slice_flag is equal to 0 and pps_one_slice_per_picture_flag is equal to 1, the value of slice_address is inferred to be equal to 0.
  f. When pps_one_slice_per_picture_flag is equal to 1, the signalling of num_tiles_in_slice_minus1 in the SH syntax may be skipped as follows:

| if( !rect_slice_flag && NumTilesInPic > 1 |  |
| --- | --- |
| && _!pps_one_slice_per_picture_flag_ ) |  |
|     num_tiles_in_slice_minus1 | ue(v) |

And the following inference is as added: When rect_slice_flag is equal to 0 and pps_one_slice_per_picture_flag is equal to 1, the value of num_tiles_in_slice_minus1 is inferred to be equal to NumTilesInPic−1.
  g. Alternative to all the above, the flag pps_one_slice_per_picture_flag is not added, but the values of the six PPS flags are required to be equal to 0 when any slice referring to the PPS has picture_header_in_slice_header_flag equal to 1.
    i. This is technically equivalent to the following constraint added to the semantics of picture_ header_in_slice_header_flag (which is better editorially). When any of the six PPS flags is equal to 1, the value of picture_header_in_slice_header_flag shall be equal to 0.

h. Alternative to all the above, the flag pps_one_slice_per_picture_flag is not added, but the values of the six PPS flags are required to be equal to 0 when one_slice_per_pic_constraint_flag is equal to 1.

i. Independently to any of the above, the following constraint may be added: When one_slice_per_pic_constraint_flag is equal to 1, the value of picture_header_in_slice_header_flag shall be equal to 1. Technically equivalently, the semantics of one_slice_per_pic_constraint_flag is updated by adding that one_slice_per_pic_constraint_flag equal to 1 also specifies that picture_header_in_slice_header_flag shall be equal to 1 (for all slices in each OLS to which the PTL syntax structure containing this flag applies).

j. When pps_one_slice_per_picture_flag is equal to 1, the signalling of rect_slice_flag in the PPS syntax may be skipped as follows (the added parts are Italic and underlined):

```
if( NumTilesInPic > 1 && !pps_one_slice_per_picture_flag )
    rect_slice_flag                                          u(1)
``` i. And the following inference is as added: When pps_one_slice_per_picture_flag is equal to 1, the value of rect_slice_flag is inferred to be equal to 1.

k. When pps_one_slice_per_picture_flag is equal to 1, the signalling of single_slice_per_subpic_flag in the PPS syntax may be skipped as follows (the added parts are Italic and underlined):

```
if( rect_slice_flag && !pps_one_slice_per_picture_flag )
    single_slice_per_subpic_flag                             u(1)
``` i. And the following inference is as added: When pps_one_slice_per_picture_flag is equal to 1, the value of single_slice_per_subpic_flag is inferred to be equal to 1.

l. When pps_one_slice_per_picture_flag is equal to 1, the signalling of loop_filter_across_slices_enabled_flag in the PPS syntax may be skipped, e.g., by conditioning the syntax element on "if(!pps_one_slice_per_picture_flag)" and inferring the value of loop_filter_across_slices_enabled_flag when pps_one_slice_per_picture_flag is equal to 0.

m. In one example, an indication of whether each picture in a CLVS has only one slice may be signalled in the SPS associated with the CLVS.

n. In one example, an indication of whether each picture in a CLVS has only one tile may be signalled in SPS associated with the CLVS.

o. When it is indicated that each picture associated with a first PPS has only one slice, one or more syntax elements related to slice partitioning (such as rect_slice_flag, single_slice_per_subpic_flag, num_slices_in_pic_minus1, tile_idx_delta_present_flag, slice_width_in_tiles_minus1, slice_height_in_tiles_minus1, num_exp_slices_in_tile, exp_slice_height_in_ctus_minus1, tile_idx_delta, etc. in JVET-Q2001-vC) may not be signaled in the first PPS.

i. In one example, the indication is pps_one_slice_per_picture_flag that is included in the PPS syntax before the slice signalling syntax, e.g., just before rect_slice_flag.

1. In one example, additionally, when pps_one_slice_per_picture_flag is equal to 1 and rect_slice_flag is not signalled, its value is inferred to be equal to 1.

2. In one example, additionally, when pps_one_slice_per_picture_flag is equal to 1 and single_slice_per_subpic_flag is not signalled, its value is inferred to be equal to 1.

3. In one example, additionally, when pps_one_slice_per_picture_flag is equal to 1 and num_slices_in_pic_minus1 is not signalled, its value is inferred to be equal to 0.

p. When it is indicated that each picture associated with a first PPS has only one tile, one or more syntax elements related to slice partitioning (such as num_exp_tile_columns_minus1, num_exp_tile_rows_minus1, tile_column_width_minus1, tile_row_height_minus1, etc. in JVET-Q2001-vC) may not be signaled in the first PPS.

i. In one example, the indication is pps_one_tile_per_picture_flag that is included in the PPS syntax before the tile signalling syntax, e.g., just before pps_log 2_ctu_size_minus5 (but under the same syntax condition "if (!no_pic_partition_flag)").

2. Regarding the signalling of the syntax element num_ref_idx_active_override_flag in SH:

1) To solve the second problem, the syntax element num_ref_idx_active_override_flag in SH may be signalled by a condition of "A & (B||C)", in which "A" indicates "rpl_info_in_ph_flag=1, or NAL unit type is not equal to IDR, or sps_idr_rpl_present_flag is equal to 1", and "B" indicates "slice_type is equal to P or B, and the number of reference entries in reference picture list 0 is greater than 1", and "C" indicates "slice_type is equal to B and the number of reference entries in reference picture list 1 is greater than 1".

a. In one example, the following syntax in PH:

```
if( ( rpl_info_in_ph_flag || ( ( nal_unit_type !=
IDR_W_RADL && nal_unit_type !=
    IDR_N_LP ) || sps_idr_rpl_present_flag ) ) &&
    ( slice_type != I && num_ref_entries[ 0 ][ RplsIdx[ 0 ] ] >
1 ) ||
    ( slice_type = = B && num_ref_entries[ 1 ][ RplsIdx[ 1 ]
] > 1 ) ) {
    num_ref_idx_active_override_flag                         u(1)
    if( num_ref_idx_active_override_flag )
        for( i = 0; i < ( slice_type = = B ? 2: 1 ); i++ )
            if( num_ref_entries[ i ][ RplsIdx[ i ] ] > 1 )
                num_ref_idx_active_minus1[ i ]               ue(v)
}
``` is changed to be as follows:

```
if( ( rpl_info_in_ph_flag || ( ( nal_unit_type !=
IDR_W_RADL && nal_unit_type !=
    IDR_N_LP ) || sps_idr_rpl_present_flag ) ) &&
    ( ( slice_type != I && num_ref_entries[ 0 ][ RplsIdx[ 0 ] ] >
```

-continued

```
  1 ) ||
  ( slice_type = = B && num_ref_entries[ 1 ][ RplsIdx[ 1 ] ] >
1 ) ) ) {
    num_ref_idx_active_override_flag                          u(1)
    if( num_ref_idx_active_override_flag )
      for( i = 0; i < ( slice_type = = B ? 2: 1 ); i++ )
        if( num_ref_entries[ i ][ RplsIdx[ i ] ] > 1 )
          num_ref_idx_active_minus1[ i ]                      ue(v)
}
```

3. To solve the 3$^{rd}$ problem, the following approaches regarding the signalling of the syntax elements ltrp_in_header_flag[listIdx][rplsIdx] and rpls_poc_lsb_lt[listIdx][rplsIdx][i] in the syntax structure ref_pic_list_struct( ) are disclosed.
  1) Whether to signal the syntax elements related to the value of the picture order count for long term reference (e.g., ltrp_in_header_flag and/or rpls_poc_lsb_lt) in the syntax structure ref_pic_list_struct( ) may depend on whether the index of the reference picture lists (e.g., rplsIdx) is smaller than the number of the ref_pic_list_struct(listIdx,rplsIdx) syntax in the SPS (e.g., num_ref_pic_lists_in_sps[listIdx]), as in the 2$^{nd}$ embodiment.
    a. In one example, if the index of the reference picture lists is equal to the number of the ref_pic_list_struct(listIdx,rplsIdx) syntax in the SPS (i.e., rplsIdx is equal to num_ref_pic_lists_in_sps [listIdx]), then the syntax elements related to the value of the picture order count for long term reference (e.g., ltrp_in_header_flag) may be not signalled and the value of ltrp_in_header_flag is inferred to be equal to either 1 or 0.
  2) Alternatively, whether to signal the syntax elements related to the value of the picture order count for long term reference (e.g., ltrp_in_header_flag and/or rpls_poc_lsb_lt) in the syntax structure ref_pic_list_struct( ) may depend on whether the syntax structure ref_pic_list_struct( ) is included in SPS or not, as in the 2$^{nd}$ embodiment.
    a. In one example, if the syntax structure ref_pic_list_struct( ) is NOT included in SPS, then the syntax elements related to the value of the picture order count for long term reference (e.g., ltrp_in_header_flag) may be not signalled and the value of ltrp_in_header_flag is inferred to be equal to either 1 or 0.
  3) Alternatively, instead of signalling the ltrp_in_header_flag inside the ref_pic_list_struct( ), it is directly signalled in the SPS, one for each ref_pic_list_struct( ) in the SPS, e.g., as follows:

```
for( i = 0; i < !rpl1_same_as_rpl0_flag ? 2 : 1; i++ ) {
    num_ref_pic_lists_in_sps[ i ]                             ue(v)
    for( j = 0; j < num_ref_pic_lists_in_sps[ i ]; j++) {
        ltrp_in_header_flag[ i ][ j ]                         u(1)
        ref_pic_list_struct( i, j )
    }
}
``` ltrp_in_header_flag[i][j] equal to 0 specifies that the POC LSBs of the LTRP entries indicated in the ref_pic_list_struct (i,j) syntax structure are present in the same syntax structure. ltrp_in_header_flag[i][j] equal to 1 specifies that the POC LSBs of the LTRP entries indicated in the ref_pic_list_struct (i,j) syntax structure are not present in the same syntax structure. The value of ltrp_in_header_flag[i][num_ref_pic_lists_in_sps[i]] is inferred to be equal to 0. (Alternatively, the value of ltrp_in_header_flag[i][num_ref_pic_lists_in_sps[i]] is inferred to be equal to 1.)

And the ref_pic_list_struct(listIdx,rplsIdx) syntax is changed as follows. Deleted texts are marked with double brackets (e.g., [[a]] denotes the deletion of the character "a"):

|  | Descriptor |
|---|---|
| ref_pic_list_struct( listIdx, rplsIdx ) { |  |
|   num_ref_entries[ listIdx ][ rplsIdx ] | ue(v) |
|   [[if( long_term_ref_pics_flag ) |  |
|     ltrp_in_header_flag[ listIdx ][ rplsIdx ] | u(1)]] |
|   for( i = 0, j = 0; i < num_ref_entries[ listIdx ][ rplsIdx ]; i++) { |  |
|     if( inter_layer_ref_pics_present_flag ) |  |
|       inter_layer_ref_pic_flag[ listIdx ][ rplsIdx ][ i ] | u(1) |
|     if( !inter_layer_ref_pic_flag[ listIdx ][ rplsIdx ][ i ] ) { |  |
|       if( long_term_ref_pics_flag ) |  |
|         st_ref_pic_flag[ listIdx ][ rplsIdx ][ i ] | u(1) |
|       if( st_ref_pic_flag[ listIdx ][ rplsIdx ][ i ] ) { |  |
|         abs_delta_poc_st[ listIdx ][ rplsIdx ][ i ] | ue(v) |
|         if( AbsDeltaPocSt[ listIdx ][ rplsIdx ][ i ] > 0 ) |  |
|           strp_entry_sign_flag[ listIdx ][ rplsIdx ][ i ] | u(1) |
|       } else_if( !ltrp_in_header_flag[ listIdx ][ rplsIdx ] ) |  |
|         rpls_poc_lsb_lt[ listIdx ][ rplsIdx ][ j++ ] | u(v) |
|     } else |  |
|       ilrp_idx[ listIdx ][ rplsIdx ][ i ] | ue(v) |
|   } |  |
| } |  |

4) Alternatively, instead of signalling the ltrp_in_header_flag inside the ref_pic_list_struct( ), it is directly signalled in the SPS, one for each of list 0 and list 1, e.g., as follows:

```
for( i = 0; i < !rpl1_same_as_rpl0_flag ? 2 : 1; i++ ) {
    num_ref_pic_lists_in_sps[ i ]                             ue(v)
    ltrp_in_header_flag[ i ]                                  u(1)
    for( j = 0; j < num_ref_pic_lists_in_sps[ i ]; j++)
        ref_pic_list_struct( i, j )
}
``` ltrp_in_header_flag[i] equal to 0 specifies that the POC LSBs of the LTRP entries indicated in each of the ref_pic_list_struct(i,j) syntax structures for j ranging from 0 to num_ref_pic_lists_in_sps[i], inclusive, are present in the same syntax structure. ltrp_in_header_flag[i][j] equal to 1 specifies that the POC LSBs of the LTRP entries indicated in each of these ref_pic_list_struct(i,j) syntax structures are not present in the same syntax structure.

And the ref_pic_lists( ) syntax is changed as follows:

```
if( ltrp_in_header_flag[ i ][[ [ RplsIdx[ i ] ] ]] )
    poc_lsb_lt[ i ][ j ]                                      u(v)
```

And the ref_pic_list_struct(listIdx,rplsIdx) syntax is changes changed as follows:

|  | Descriptor |
|---|---|
| ref_pic_list_struct( listIdx, rplsIdx ) { |  |
|   num_ref_entries[ listIdx ][ rplsIdx ] | ue(v) |
|   [[ if( long_term_ref_pics_flag ) |  |
|     ltrp_in_header_flag[ listIdx ][ rplsIdx ] | u(1)]] |
|   for( i = 0, j = 0; i < num_ref_entries[ listIdx ][ rplsIdx ]; |  |

| | Descriptor |
|---|---|
| i++ ) { | |
|   if( inter_layer_ref_pics_present_flag ) | |
|     inter_layer_ref_pic_flag[ listIdx ][ rplsIdx ][ i ] | u(1) |
|   if( !inter_layer_ref_pic_flag[ listIdx ][ rplsIdx ][ i ] ) { | |
|     if( long_term_ref_pics_flag ) | |
|       st_ref_pic_flag[ listIdx ][ rplsIdx ][ i ] | u(1) |
|     if( st_ref_pic_flag[ listIdx ][ rplsIdx ][ i ] ) { | |
|       abs_delta_poc_st[ listIdx ][ rplsIdx ][ i ] | ue(v) |
|       if( AbsDeltaPocSt[ listIdx ][ rplsIdx ][ i ] > 0 ) | |
|         strp_entry_sign_flag[ listIdx ][ rplsIdx ][ i ] | u(1) |
|     } else if( !ltrp_in_header_flag[ listIdx ][[ [ rplsIdx ] ]]) | |
|       rpls_poc_lsb_lt[ listIdx ][ rplsIdx ][ j++ ] | u(v) |
|   } else | |
|     ilrp_idx[ listIdx ][ rplsIdx ][ i ] | ue(v) |
|   } | |
| } | |

5) Alternatively, instead of signalling the ltrp_in_header_flag inside the ref_pic_list_struct( ), it is directly signalled in the SPS, only one, e.g., as follows:

| | |
|---|---|
| <u>*ltrp_in_header_flag*</u> | <u>*u(1)*</u> |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | | ltrp_in_header_flag equal to 0 specifies that the POC LSBs of the LTRP entries indicated in each of the ref_pic_list_struct(i,j) syntax structures for i ranging from 0 to (!rpl1_same_as_rpl0_flag?2:1), inclusive, and j ranging from 0 to num_ref_pic_lists_in_sps[i], inclusive, are present in the same syntax structure. ltrp_in_header_flag[i][j] equal to 1 specifies that the POC LSBs of the LTRP entries indicated in each of these ref_pic_list_struct(i,j) syntax structures are not present in the same syntax structure.

And the ref_pic_lists( ) syntax is changed as follows:

| | |
|---|---|
| if( ltrp_in_header_flag [[ [ i ][ RplsIdx[ i ] ] ]] ) | |
|   poc_lsb_lt[ i ][ j ] | u(v) |

And the ref_pic_list_struct(listIdx,rplsIdx) syntax is changed as follows:

| | Descriptor |
|---|---|
| ref_pic_list_struct( listIdx, rplsIdx ) { | |
|   num_ref_entries[ listIdx ][ rplsIdx ] | ue(v) |
| [[ if( long_term_ref_pics_flag ) | |
|   ltrp_in_header_flag[ listIdx ][ rplsIdx ] | u(1) ]] |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header flag [[ [ listIdx ][ rplsIdx ] ]] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

6) Alternatively, instead of signalling the ltrp_in_header_flag and rpls_poc_lsb_lt inside the ref_pic_list_struct( ), they are directly signalled in the SPS, one set for each ref_pic_list_struct( ) in the SPS, e.g., as in the $2^{nd}$ embodiment.

7) Alternatively, instead of signalling the ltrp_in_header_flag and rpls_poc_lsb_lt inside the ref_pic_list_struct( ), they are directly signalled in the SPS, one set for each of list 0 and list 1, e.g., as in the $2^{nd}$ embodiment.

8) Alternatively, instead of signalling the ltrp_in_header_flag and rpls_poc_lsb_lt inside the ref_pic_list_struct( ), they are directly signalled in the SPS, only one set, e.g., as in the $2^{nd}$ embodiment.

4. Regarding the signalling of the syntax elements related to reference pictures in reference picture list 1 in the syntax structure ref_pic_list( ):

1) To solve the $4^{th}$ problem, whether to signal the syntax elements related to the reference info of reference picture list 1 (e.g., rpl_sps_flag[1], rpl_idx[1], poc_lsb_lt[1][j], delta_poc_msb_present_flag[1][j], delta_poc_msb_cycle_lt[1][j] in which j is in the range of 0 to NumLtrpEntries[1][RplsIdx[1]−1, inclusive) in the syntax structure ref_pic_list( ) may be dependent on a variable X (e.g., X=1 or 2 or depending on the slice type), as in the $3^{rd}$ embodiment.

6. EMBODIMENTS

Below are some example embodiments for some of the aspects summarized above in Section 5, which can be applied to the VVC specification. The changed texts are based on the latest VVC text in JVET-Q2001-vC. Most relevant parts that have been added or modified are highlighted in Italic and underlined, and some of the deleted parts are marked with double brackets (e.g., [[a]] denotes the deletion of the character "a").

First Embodiment

This is an embodiment of items 1, 1.1, 1.1.a, 1.1.b, 1.1.b.iii, 1.1.b.iv, 1.1.c, 1.1.c.i, 1.1.e, 1.1.f, and 1.1.i summarized above in Section 5.

7.3.2.4 Picture Parameter Set RBSP Syntax

| | Descriptor |
|---|---|
| pic_parameter_set_rbsp( ) { | |
| ... | |
|   pps_one_slice_per_picture_flag | *u(1)* |
|   *if( !pps_one_slice_per_picture_flag ) {* | |
|     rpl_info_in_ph_flag | u(1) |
|     if( deblocking_filter_override_enabled_flag ) | |
|       dbf_info_in_ph_flag | u(1) |
|     sao_info_in_ph_flag | u(1) |
|     alf_info_in_ph_flag | u(1) |
|     if( ( pps_weighted_pred_flag \|\| pps_weighted_bipred_flag ) && rpl_info_in_ph_flag ) | |
|       wp_info_in_ph_flag | u(1) |
|     qp_delta_info_in_ph_flag | u(1) |
|   *}* | |
|   ... | |
| } | |

7.4.3.4 Picture Parameter Set RBSP Semantics pps_one_slice_per_picture_flag equal to 1 specifies that each picture referring to the PPS has only one slice. pps_one_slice_per_picture_flag equal to 0 specifies that each picture referring to the PPS has one or more slices. The value of pps_one_slice_per_picture_flag shall be the same in all PPSs that are referred to by coded pictures in a CLVS.

When one_slice_per_pic_constraint_flag is equal to 1, the value of pps_one_slice_per_picture_flag shall be equal to 1.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure. When not present, the value of rpl_info_in_ph_flag is inferred to be equal to 0.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0.

sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure. When not present, the value of sao_info_in_ph_flag is inferred to be equal to 0.

alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure. When not present, the value of alf_info_in_ph_flag is inferred to be equal to 0.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure. When not present, the value of qp_delta_info_in_ph_flag is inferred to be equal to 0.

. . .

7.3.7.1 General Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 && *!pps_one_slice_per_picutre_flag* ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 && *!pps_one_slice_per_picutre_flag* ) | |
|     num_tiles_in_slice_minus1 | ue(v) |
|   ... | |
| } | |

7.4.8.1 General Slice Header Semantics

. . .

picture_header_in_slice_header_flag equal to 1 specifies that the PH syntax structure is present in the slice header. picture_header_in_slice_header_flag equal to 0 specifies that the PH syntax structure is not present in the slice header. It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

When one_slice_per_pic_constraint_flag is equal to 1, the value of picture header in slice header flag shall be equal to 1.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. [[When rect_slice_flag is equal to 1 and NumSlicesInSubpic[CurrSubpicIdx] is equal to 1, the value of slice_address is inferred to be equal to 0.]]

If rect_slice_flag is equal to 0, the following applies:
The slice address is the raster scan tile index.
The length of slice_address is Ceil(Log2 (NumTilesInPic)) bits.
The value of slice_address shall be in the range of 0 to NumTilesInPic−1, inclusive.

Otherwise (rect_slice_flag is equal to 1), the following applies:

The value of slice_address shall be in the range of 0 to NumSlicesInSubpic[CurrSubpicIdx]−1, inclusive.

It is a requirement of bitstream conformance that the following constraints apply:
If rect_slice_flag is equal to 0 or subpic_info_present_flag is equal to 0, the value of slice_address shall not be equal to the value of slice_address of any other coded slice NAL unit of the same coded picture.
Otherwise, the pair of slice_subpic_id and slice_address values shall not be equal to the pair of slice_subpic_id and slice_address values of any other coded slice NAL unit of the same coded picture.
The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1[[, when present,]] specifies the number of tiles in the slice when rect_slice_flag is equal to 0. The value of num_tiles_in_slice_minus1 shall be in the range of 0 to NumTilesInPic−1, inclusive. When rect_slice_flag is equal to 0 and num_tiles_in_slice_minus1 is not present, the value of num_tiles_in_slice_minus1 is inferred to be equal to NumTilesInPic−1.

6.1. Second Embodiment

This is an embodiment of items 3.1, 3.1a, 3.2, 3.2a, 3.6, 3.7, and 3.8 summarized above in Section 5.

6.1.1. Embodiment of Items 3.1 and 3.1a

In one example, the ref_pic_list_struct(listIdx,rplsIdx) is changed as follows:

|  | Descriptor |
|---|---|
| ref_pic_list_struct( listIdx, rplsIdx ) { |  |
|   num_ref_entries[ listIdx ][ rplsIdx ] | ue(v) |
|   if( long_term_ref_pics_flag && rplsIdx (num_ref_pic_lists_in_sps[ listIdx ] ) |  |
|     ltrp_in_header_flag[ listIdx ][ rplsIdx ] | u(1) |
|   for( i = 0, j = 0; i < num_ref_entries[ listIdx ][ rplsIdx ]; i++) { |  |
|     if( inter_layer_ref_pics_present_flag ) |  |
|       inter_layer_ref_pic_flag[ listIdx ][ rplsIdx ][ i ] | u(1) |
|     if( !inter_layer_ref_pic_flag[ listIdx ][ rplsIdx ][ i ] ) { |  |
|       if( long_term_ref_pics_flag ) |  |
|         st_ref_pic_flag[ listIdx ][ rplsIdx ][ i ] | u(1) |
|       if( st_ref_pic_flag[ listIdx ][ rplsIdx ][ i ] ) { |  |
|         abs_delta_poc_st[ listIdx ][ rplsIdx ][ i ] | ue(v) |
|         if( AbsDeltaPocSt[ listIdx ][ rplsIdx ][ i ] > 0 ) |  |
|           strp_entry_sign_flag[ listIdx ][ rplsIdx ][ i ] | u(1) |
|       } else if( !ltrp_in_header_flag[ listIdx ][ rplsIdx ] ) |  |
|         rpls_poc_lsb_lt[ listIdx ][ rplsIdx ][ j++ ] | u(v) |
|     } else |  |
|       ilrp_idx[ listIdx ][ rplsIdx ][ i ] | ue(v) |
|   } |  |
| } |  |

The slice address is the subpicture-level slice index of the slice.

The length of slice_address is Ceil(Log2(NumSlicesInSubpic[CurrSubpicIdx])) bits.

6.1.2. Embodiment of Items 3.2 and 3.2a

Alternatively, the ref_pic_list_struct(listIdx,rplsIdx) is changed as follows:

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag && *nal_unit_type* = = *SPS_NUT* ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | | ltrp_in_header_flag[listIdx][rplsIdx] equal to 0 specifies that the POC LSBs of the LTRP entries in the ref_pic_list_struct(listIdx,rplsIdx) syntax structure are present in the ref_pic_list_struct(listIdx,rplsIdx) syntax structure. ltrp_in_header_flag[listIdx][rplsIdx] equal to 1 specifies that the POC LSBs of the LTRP entries in the ref_pic_list_struct (listIdx,rplsIdx) syntax structure are not present in the ref_pic_list_struct(listIdx,rplsIdx) syntax structure. When not present and long_term_ref_pics_flag is equal to 1, the value of ltrp_in_header_flag[listIdx][rplsIdx] is inferred to be equal to 0. (Alternatively, when not present and long_term_ref_pics_flag is equal to 1, the value of ltrp_in_header_flag[listIdx][rplsIdx] is inferred to be equal to 1.)

6.1.3. Embodiment of Item 3.6

Alternatively, the seq_parameter_set_rbsp( ) and ref_pic_list_struct( ) are changes as follows:

| | Descriptor |
|---|---|
| seq_parameter_set_rbsp( ) { | |
|   ... | |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) { | |
|       *ltrp_in_header_flag[ i ][ j ]* | *u( 1 )* |
|       ref_pic_list_struct( i, j ) | |
|       *for( k = 0; k <NumLtrpEntries[ i ][ j ]; k++ ) {* | |
|         *if( !ltrp_in_header_flag[ i ][ j ] )* | |
|           *rpls_poc_lsb_lt[ i ][ j ][ k ]* | *u( v )* |
|       *}* | |
|     *}* | |
|   } | |
|   ... | |
| } | | ltrp_in_header_flag[i][j] equal to 0 specifies that the POC LSBs of the LTRP entries in the j-th reference picture list in reference picture list i are present in the SPS syntax structure. ltrp_in_header_flag[i][j] equal to 1 specifies that the POC LSBs of the LTRP entries in the i-th reference picture list in reference picture list i are present in PH or SH. The value of ltrp_in_header_flag[i][num_ref_pic_lists_in_sps[i]] is inferred to be equal to 0. (Alternatively, the value of ltrp_in_header_flag[i][num_ref_pic_lists_in_sps[i]] is inferred to be equal to 1.)

rpls_poc_lsb_lt[i][j][k] specifies the value of the picture order count modulo MaxPicOrderCntLsb of the k-th LTRP entry in the i-th reference picture list in reference picture list i. The length of the rpls_poc_lsb_lt[i][j][k] syntax element is log2_max_pic_order_cnt_lsb_minus4+4 bits.

And the ref_pic_list_struct(listIdx,rplsIdx) syntax is changed as follows:

| | Descriptor |
|---|---|
| ref_pic_list_struct( listIdx, rplsIdx ) { | |
|   num_ref_entries[ listIdx ][ rplsIdx ] | ue(v) |
|   [[if( long_term_ref_pics_flag ) | |
|     ltrp_in_header_flag[ listIdx ][ rplsIdx ] | u(1)]] |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       }[[ else if( !ltrp_in_header_flag[ listIdx ][ rplsIdx ] ) | |
|         rpls_poc_lsb_lt[ listIdx ][ rplsIdx ][ j++ ] | u(v)]] |
|     } else | |
|       ilrp_idx[ listIdx ][ rplsIdx ][ i ] | ue(v) |
|   } | |
| } | |

[[ltrp_in_header_flag[listIdx][rplsIdx] equal to 0 specifies that the POC LSBs of the LTRP entries in the ref_pic_list_struct(listIdx,rplsIdx) syntax structure are present in the ref_pic_list_struct(listIdx,rplsIdx) syntax structure. ltrp_in_header_flag[listIdx][rplsIdx] equal to 1 specifies that the POC LSBs of the LTRP entries in the ref_pic_list_struct(listIdx,rplsIdx) syntax structure are not present in the ref_pic_list_struct(listIdx,rplsIdx) syntax structure.

rpls_poc_lsb_lt[listIdx][rplsIdx][i] specifies the value of the picture order count modulo MaxPicOrderCntLsb of the picture referred to by the i-th entry in the ref_pic_list_struct (listIdx,rplsIdx) syntax structure. The length of the rpls_poc_lsb_lt[listIdx Jr[rplsIdx Jr[i] syntax element is log2_max_pic_order_cnt_lsb_minus4+4 bits.]]

6.1.4. Embodiment of 3.7

Alternatively, the seq_parameter_set_rbsp( ) and ref_pic_list_struct( ) are changes as follows:

| | Descriptor |
|---|---|
| seq_parameter_set_rbsp( ) { | |
|   ... | |
|   for( i = 0; i < !rpl1_same_as_rpl0_flag ? 2 : 1; i++ ) { | |
|     num_ref_pic_lists_in_sps[ i ] | ue(v) |
|     *__ltrp_in_header_flag__[ i ]* | *u(1)* |
|     for( j = 0; j < num_ref_pic_lists_in_sps[ i ]; j++) *{* | |
|       ref_pic_list_struct( i, j ) | |
|       *for( k = 0; k < NumLtrpEntries[ i ][ j ]; k++ ) {* | |
|         *if( !ltrp_in_header_flag[ i ] )* | |
|           *__rpls_poc_lsb_lt__[ i ][ j ][ k ]* | *u(v)* |
|       *}* | |
|     *}* | |
|   } | |
|   ... | |
| } | | ltrp_in_header_flag[i] if equal to 0 specifies that the POC LSBs of the LTRP entries in reference picture list i are present in the SPS syntax structure. ltrp_in_header_flag[i] equal to 1 specifies that the POC LSBs of the LTRP entries in reference picture list i are present in PH or SH.

rpls_poc_lsb_lt[i][j][k] specifies the value of the picture order count modulo MaxPicOrderCntLsb of the k-th LTRP entry in the j-th reference picture list in reference picture list i. The length of the rpls_poc_lsb_lt[i][j][k] syntax element is log2_max_pic_order_cnt_lsb_minus4+4 bits.

And the ref_pic_lists( ) sytnax is changed as follows:

| | |
|---|---|
| if( ltrp_in_header_flag[ i ][[ [ RplsIdx[ i ] ] ]]) | |
|   poc_lsb_lt[ i ][ j ] | u(v) |

And the ref_pic_list_struct(listIdx,rplsIdx) syntax is changed as follows:

|  | Descriptor |
|---|---|
| ref_pic_list_struct( listIdx, rplsIdx ) { | |
|   num_ref_entries[ listIdx ][ rplsIdx ] | ue(v) |
| [[ if( long_term_ref_pics_flag ) | |
|   ltrp_in_header_flag[ listIdx ][ rplsIdx ] | u(1) ]] |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } [[ else if( !ltrp_in_header_flag[ listIdx ][ rplsIdx ] ) | |
|         rpls_poc_lsb_lt[ listIdx ][ rplsIdx ][ j++ ] | u(v)]] |
|     } else | |
|       ilrp_idx[ listIdx ][ rplsIdx ][ i ] | ue(v) |
|   } | |
| } | |

[[ltrp_in_header_flag[listIdx][rplsIdx] equal to 0 specifies that the POC LSBs of the LTRP entries in the ref_pic_list_struct(listIdx,rplsIdx) syntax structure are present in the ref_pic_list_struct(listIdx,rplsIdx) syntax structure. ltrp_in_header_flag[listIdx][rplsIdx] equal to 1 specifies that the POC LSBs of the LTRP entries in the ref_pic_list_struct(listIdx,rplsIdx) syntax structure are not present in the ref_pic_list_struct(listIdx,rplsIdx) syntax structure.

rpls_poc_lsb_lt[listIdx][rplsIdx][i] specifies the value of the picture order count modulo MaxPicOrderCntLsb of the picture referred to by the i-th entry in the ref_pic_list_struct (listIdx,rplsIdx) syntax structure. The length of the rpls_poc_lsb_lt[listIdx][rplsIdx][i] syntax element is log2_maxpic_order_cnt_lsb_minus4+4 bits.]]

6.1.5. Embodiment of 3.8

Alternatively, the seq_parameter_set_rbsp( ) and ref_pic_list_struct( ) are changes as follows:

|  | Descriptor |
|---|---|
| seq_parameter_set_rbsp( ) { | |
|   ... | |
|   *ltrp_in_header_flag* | *u(1)* |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) { | |
|       ref_pic_list_struct( i, j ) | |
|       *for( k = 0; k < NumLtrpEntries[ i ][ j ]; k++ ) {* | |
|         *if( !ltrp_in_header_flag[ i ] )* | |
|           *rpls_poc_lsb_lt[ i ][ j ][ k ]* | *u(v)* |
|       *}* | |
|     } | |
|   } | |
|   ... | |
| } | | ltrp_in_header_flag equal to 0 specifies that the POC LSBs of the LTRP entries indicated in each of the ref_pic_list_struct(i,j) syntax structures for i ranging from 0 to (!rpl1_same_as_rpl0_flag?2:1), inclusive, and j ranging from 0 to num_ref_pic_lists_in_sps[i], inclusive, are present in the SPS syntax structure. ltrp_in_header_flag[i][j] equal to 1 specifies that the POC LSBs of the LTRP entries indicated in each of these ref_pic_list_struct(i,j) syntax structures are not present in PH or SH.

rpls_poc_lsb_lt[i][j][k] specifies the value of the picture order count modulo MaxPicOrderCntLsb of the k-th LTRP entry in the j-th reference picture list in reference picture list i. The length of the rpls_poc_lsb_lt[i][j][k] syntax element is log2_max_pic_order_cnt_lsb_minus4+4 bits.

And the ref_pic_lists( ) sytnax is changed as follows:

| | |
|---|---|
| if( ltrp_in_header_flag [[ [ i ][ RplsIdx[ i ] ]]] ) | |
|   poc_lsb_lt[ i ][ j ] | u(v) |

And the ref_pic_list_struct(listIdx,rplsIdx) syntax is changed as follows:

| | Descriptor |
|---|---|
| ref_pic_list_struct( listIdx, rplsIdx ) { | |
|   num_ref_entries[ listIdx ][ rplsIdx ] | ue(v) |
| [[ if( long_term_ref_pics_flag ) | |
|   ltrp_in_header_flag[ listIdx ][ rplsIdx ] | u(1)]] |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } [[else if( !ltrp_in_header_flag[ listIdx ][ rplsIdx ] ) | |
|         rpls_poc_lsb_lt[ listIdx ][ rplsIdx ][ j++ ] | u(v)]] |
|     } else | |
|       ilrp_idx[ listIdx ][ rplsIdx ][ i ] | ue(v) |
|   } | |
| } | |

[[ltrp_in_header_flag[listIdx][rplsIdx] equal to 0 specifies that the POC LSBs of the LTRP entries in the ref_pic_list_struct(listIdx,rplsIdx) syntax structure are present in the ref_pic_list_struct(listIdx,rplsIdx) syntax structure. ltrp_in_header_flag[listIdx][rplsIdx] equal to 1 specifies that the PC LSBs of the LTRP entries in the ref_pic_list_struct(listIdx, rplsIdx) syntax structure are not present in the ref_pic_list_struct(listIdx,rplsIdx) syntax structure.

rpls_poc_lsb_lt[listIdx][rplsIdx][i] specifies the value of the picture order count modulo MaxPicOrderCntLsb of the picture referred to by the i-th entry in the ref_pic_list_struct (listIdx,rplsIdx) syntax structure. The length of the rpls_poc_lsb_lt[listIdx][rplsIdx][i+] syntax element is log2_max_pic_order_cnt_lsb_minus4+4 bits.]]

6.2. Third Embodiment

This is an embodiment of item 4.1 summarized above in Section 5.

In one example, the syntax structures picture_header_structure( ), slice_header( ) and ref_pic_lists( ) are changed as follows:

| | Descriptor |
|---|---|
| picture_header_structure( ) { | |
|   gdr_or_irap_pic_flag | u(1) |
|   ... | |
|   if( rpl_info_in_ph_flag ) | |
|     ref_pic_lists( *2* ) | |
|   ... | |

| | Descriptor |
|---|---|
| slice_header( ) { | |
|   picture_header_in_slice_header_flag | u(1) |
|   ... | |
|   if( !intra_only_constraint_flag && !rpl_info_in_ph_flag && ( ( nal_unit_type != IDR_W_RADL && nal_unit_type != IDR_N_LP ) \|\| sps_idr_rpl_present_flag ) ) | |
|     ref_pic_lists( *slice_type = = B ? 2: 1* ) | |
|   ... | |

| | Descriptor |
|---|---|
| ref_pic_lists( maxRefList ) { | |
|   for( i = 0; i < maxRefList; i++ ) { | |
|     if( num_ref_pic_lists_in_sps[ i ] > 0 && | |
|       ( i = = 0 | | ( i = = 1 && rpl1_idx_present_flag ) ) ) | |
|       rpl_sps_flag[ i ] | u(1) |
|     if( rpl_sps_flag[ i ] ) { | |
|       if( num_ref_pic_lists_in_sps[ i ] > 1 && | |
|         ( i = = 0 | | ( i = = 1 && rpl1_idx_present_flag ) ) ) | |
|         rpl_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_header_flag[ i ][ RplsIdx[ i ] ] ) | |
|         poc_lsb_lt[ i ][ j ] | u(v) |
|       delta_poc_msb_present_flag[ i ][ j ] | u(1) |
|       if( delta_poc_msb_present_flag[ i ][ j ] ) | |
|         delta_poc_msb_cycle_lt[ i ][ j ] | ue(v) |
|     } | |
|   } | |
| } | |

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HIDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
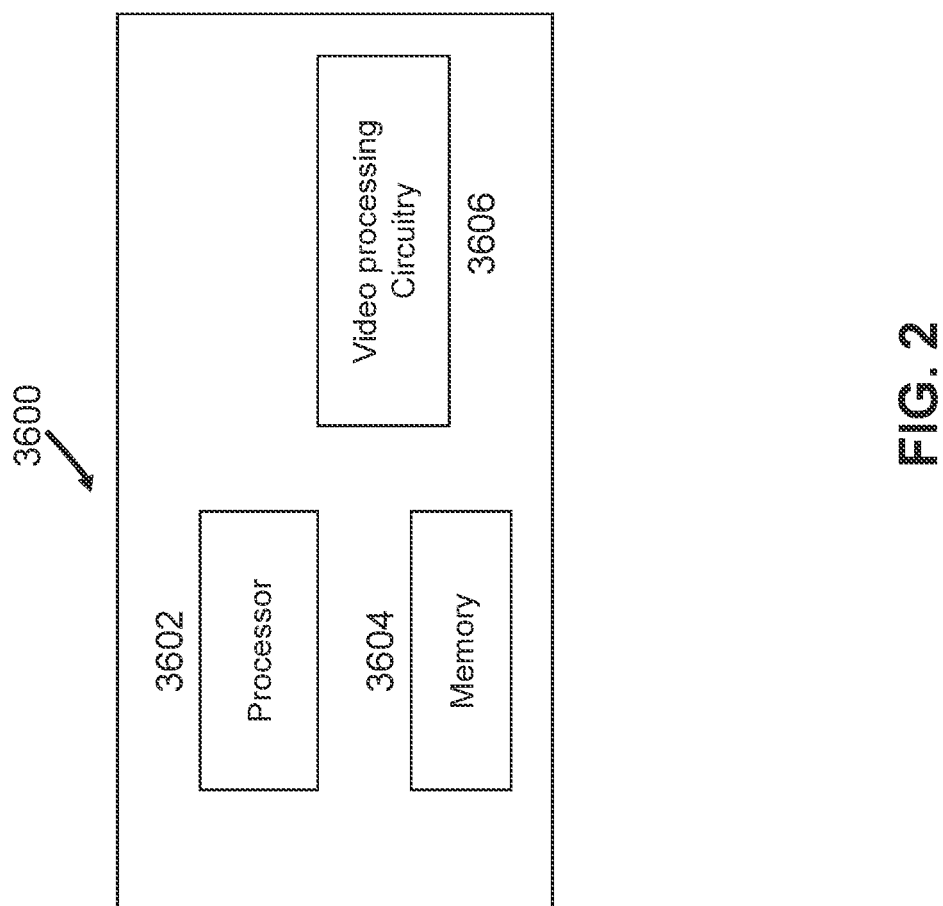
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the hardware 3606 may be partly or entirely in the processor 3602, e.g., a graphics processor.

Figure 4:
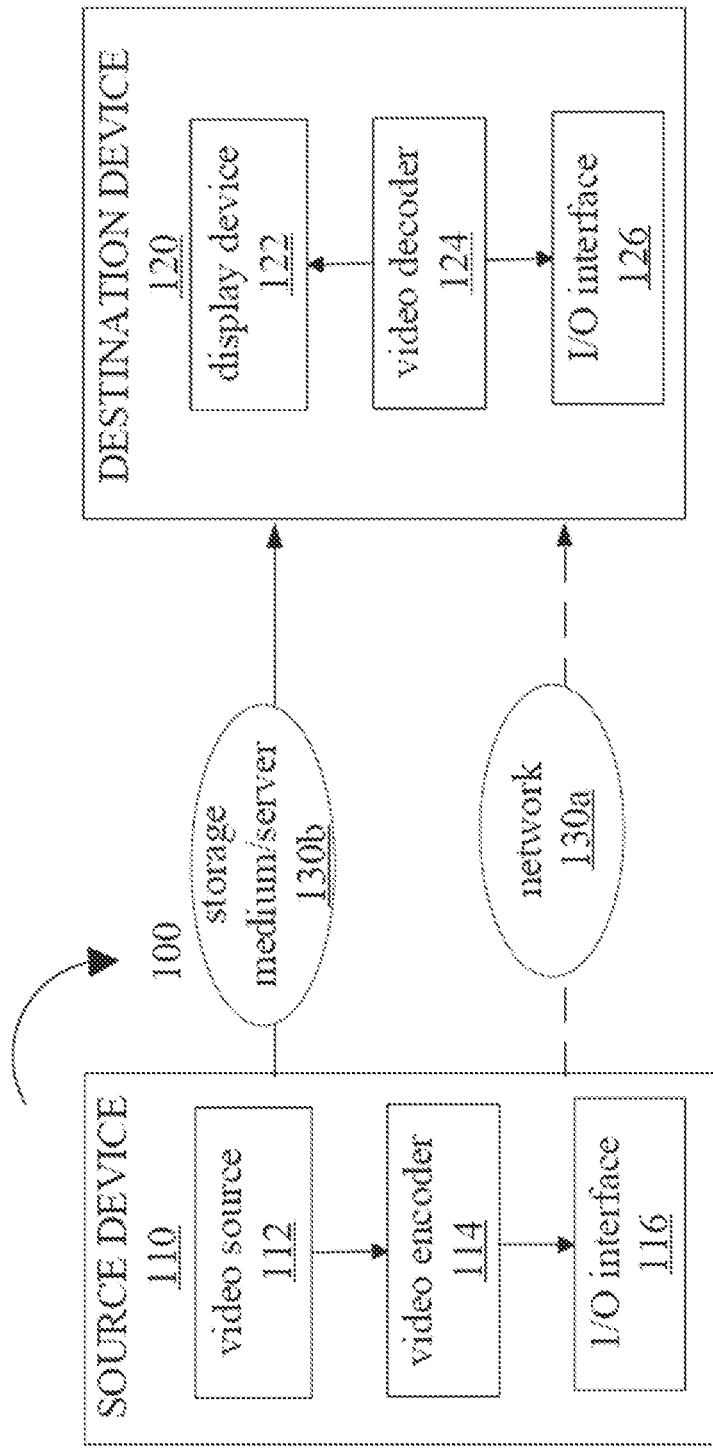
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
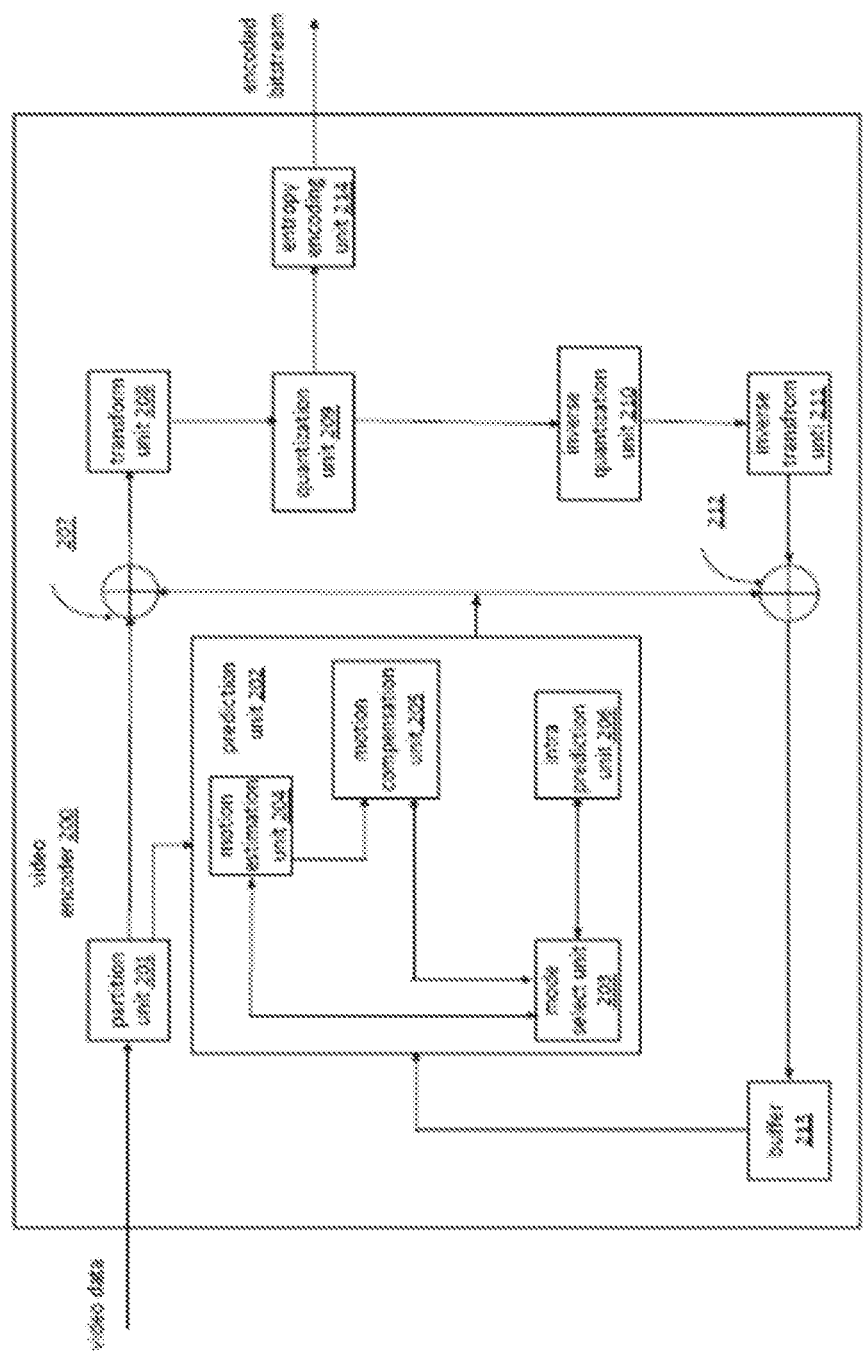
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
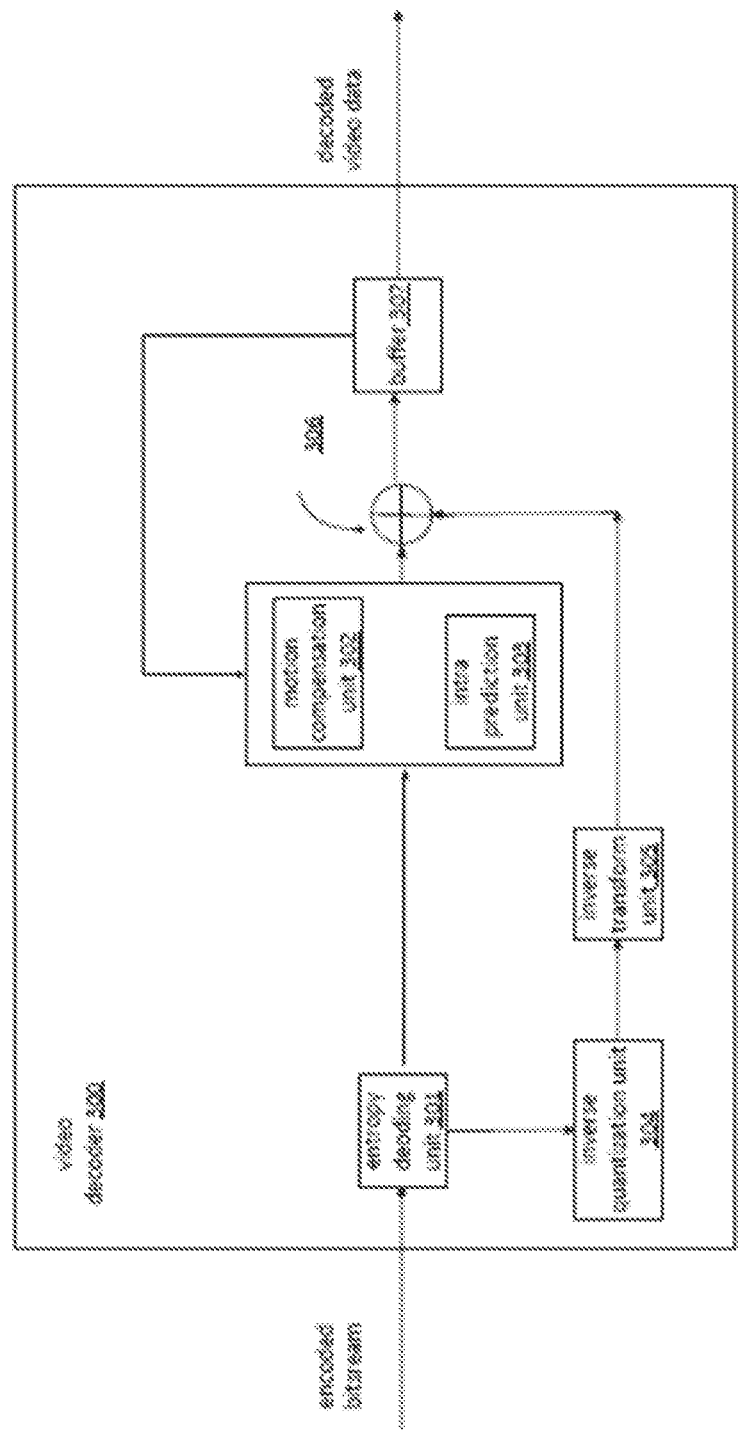
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section (e.g., item 1).

Figure 3:
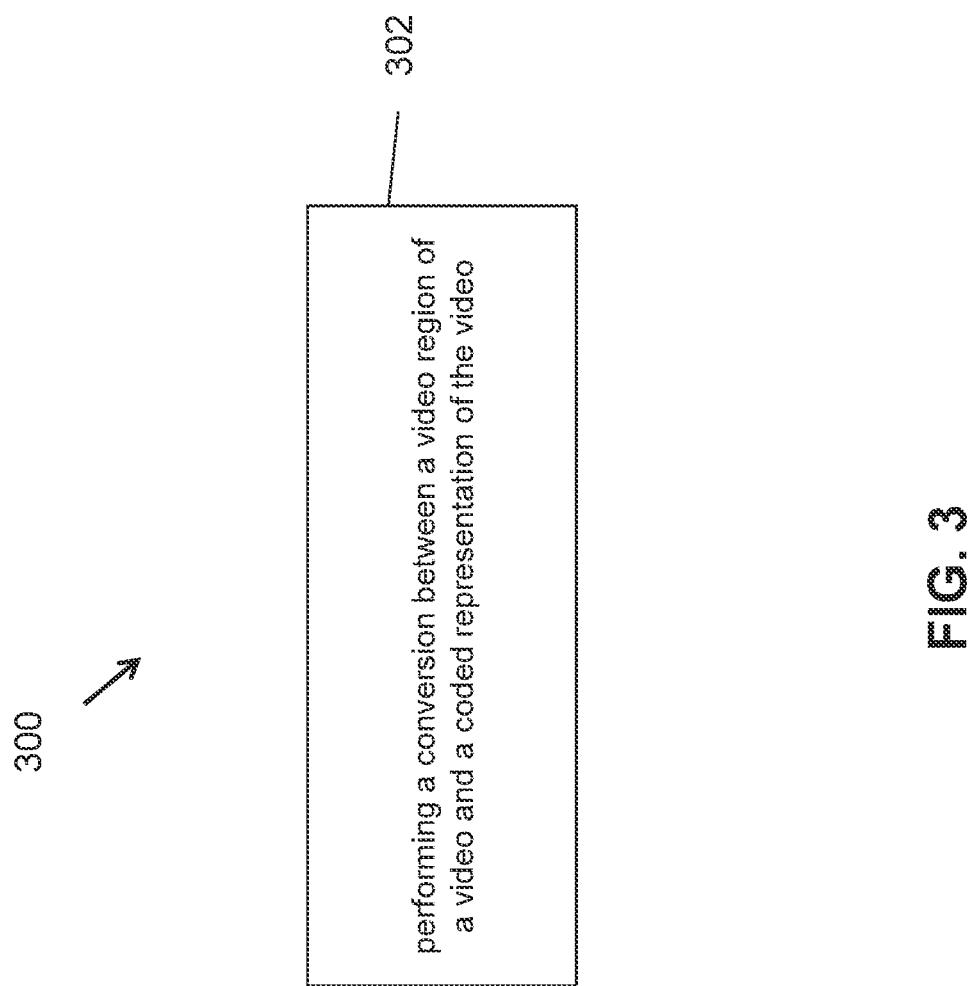
FIG. 3 is a flowchart for an example method of video processing.

1. A video processing method (e.g., method 300 depicted in FIG. 3), comprising: performing (302) a conversion between a video having one or more pictures and a coded representation of the video, wherein each of the one or more pictures comprise exactly one slice; wherein the coded representation conforms to a format rule; wherein the format rule specifies that picture parameter set flags are excluded from the coded representation due for picture having exactly one slice.

2. The method of clause 1, wherein the format rule specifies that an indication of whether each picture referring to a picture parameter set is signaled in the picture parameter set.

3. The method of clause 1, wherein, the format rule further specifies to omit an indication of absence of the picture parameter set flags in the coded representation.

4. The method of clause 1, wherein the format rule specifies that, for a picture having exactly once slice, the coded representation skips signaling of a flag that indicates presence of a picture header in a slice header.

The following clauses show example embodiments of techniques discussed in the previous section (e.g., item 2).

5. A method of video processing, comprising: performing a conversion between a video slice of a video and a coded representation of the video, wherein the coded representation conforms to a format rule, wherein the format rule specifies to include a first field indicative of presence of a second field identifying a maximum index for a reference picture used for coding the video slice based on a condition; wherein the condition is representable as a logical expression "A & (B∥C)", in which A indicates "rpl_info_in_ph_flag=1, or NAL unit type is not equal to IDR, or sps_idr_rpl_present_flag is equal to 1", and "B" indicates "slice_type is equal to P or B, and the number of reference entries in reference picture list 0 is greater than 1", and "C" indicates "slice_type is equal to B and the number of reference entries in reference picture list 1 is greater than 1" and "&" is logical "and" operation and "∥" is logical "or" operation.

The following clauses show example embodiments of techniques discussed in the previous section (e.g., item 3).

6. A method of video processing, comprising: performing a conversion between a video region of a video and a coded representation of the video, wherein the coded representation conforms to a format rule, wherein the format rule specifies a condition that controls use of a syntax element indicative of a picture order count for a long term reference picture used for the conversion of the video region.

7. The method of clause 6, wherein the format rule specifies that the syntax element is included in the coded representation if and only if an index of a reference picture list is smaller than a number of reference picture list syntax structure that is included in a sequence parameter set.

8. The method of clause 6, wherein the format rule specifies that the syntax element is included in the coded representation if and only if a reference picture list syntax structure is includes in a sequence parameter set of the coded representation.

The following clauses show example embodiments of techniques discussed in the previous section (e.g., item 4).

9. A method of video processing, comprising: performing a conversion between a video region of a video and a coded representation of the video, wherein the coded representation conforms to a format rule, wherein the format rule specifies that reference picture related syntax structures are includes if and only if a variable X is equal to a specific value, wherein X depends on a slice type of the video region.

10. The method of clause 9, wherein the specific value is equal to 1 or 2.

11. The method of any of above clauses, wherein the video region comprises a video coding unit.

12. The method of any of above clauses, wherein the video region comprises a video picture.

13. The method of any of clauses 1 to 12, wherein the conversion comprises encoding the video into the coded representation.

14. The method of any of clauses 1 to 12, wherein the conversion comprises decoding the coded representation to generate pixel values of the video.

15. A video decoding apparatus comprising a processor configured to implement a method recited in one or more of clauses 1 to 14.

16. A video encoding apparatus comprising a processor configured to implement a method recited in one or more of clauses 1 to 14.

17. A computer program product having computer code stored thereon, the code, when executed by a processor, causes the processor to implement a method recited in any of clauses 1 to 14.

18. A method, apparatus or system described in the present document.

The second set of clauses describe certain features and aspects of the disclosed techniques in the previous section (e.g., Items 1.1.a to 1.1.f and 1.1.h to 1.1.p in 'Example techniques and embodiments' section).

Figure 7A:
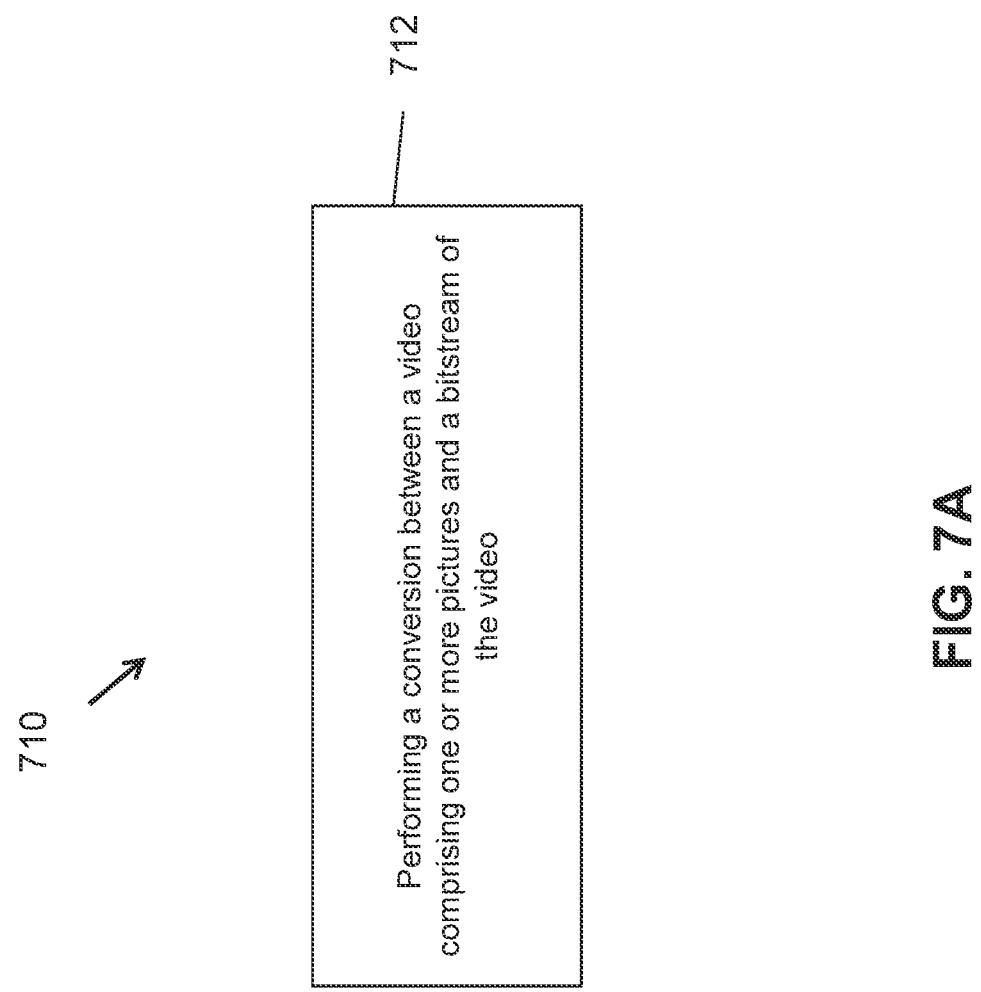
FIGS. 7A to 7D are flowcharts for example methods of video processing.

1. A method of video processing (e.g., method 710 as shown in FIG. 7A), comprising: performing 712 a conversion between a video comprising one or more pictures and a bitstream of the video; wherein the bitstream conforms to a format rule; wherein the format rule specifies that one or more syntax elements indicative of coding information are selectively included in a picture parameter set of the bitstream responsive to whether it is indicated that each picture referring to the picture parameter set comprises a single slice.

2. The method of clause 1, wherein the one or more syntax elements include six flags that are indicative of whether certain coding syntax elements are included either in the picture header syntax structure or directly in the slice header.

3. The method of clause 2, wherein the six flags include a first flag indicative of whether reference picture list information is included either in the picture header syntax structure or directly in the slice header.

4. The method of clause 3, wherein the format rule further specifies that the value of the first flag is inferred to be equal to 0 in case that the first flag is not present in the picture parameter set.

5. The method of clauses 2 to 4, wherein the six flags include a second flag indicative of whether deblocking filter information is included either in the picture header syntax structure or directly in the slice header.

6. The method of any of clause 5, wherein the format rule further specifies that the value of the second flag is inferred to be equal to 0 in case that the second flag is not present in the picture parameter set.

7. The method of any of clauses 2 to 6, wherein the six flags include a third flag indicative of whether sample adaptive offset filter information is included either in the picture header syntax structure or directly in the slice header.

8. The method of any of clause 7, wherein the format rule further specifies that the value of the third flag is inferred to be equal to 0 in case that the third flag is not present in the picture parameter set.

9. The method of any of clauses 2 to 8, wherein the six flags include a fourth flag indicative of whether adaptive loop filter information is included either in the picture header syntax structure or directly in the slice header.

10. The method of any of clause 9, wherein the format rule further specifies that the value of the fourth flag is inferred to be equal to 0 in case that the fourth flag is not present in the picture parameter set.

11. The method of any of clauses 2 to 10, wherein the six flags include a fifth flag indicative of whether weighted prediction information is included either in the picture header syntax structure or directly in the slice header.

12. The method of clause 11, wherein the format rule further specifies that the value of the fifth flag is inferred to be equal to 0 in case that the fifth flag is not present in the picture parameter set.

13. The method of any of clauses 2 to 12, wherein the six flags include a sixth flag indicative of whether quantization parameter delta information is included either in the picture header syntax structure or directly in the slice header.

14. The method of any of clause 13, wherein the format rule further specifies that the value of the sixth flag is inferred to be equal to 0 in case that the sixth flag is not present in the picture parameter set.

15. The method of any of clauses 1 to 14, wherein the at least one flags include a seventh flag that indicates whether in-loop filtering operations across slice boundaries are enabled for pictures referring to the picture parameter set.

16. The method of any of clause 15, wherein the format rule further specifies that the value of the seventh flag is inferred to be equal to 0 in case that the seventh flag is not present in the picture parameter set.

17. The method of any of clauses 1 to 16, wherein the format rule further specify to omit the one or more syntax elements in case that it is indicated that each picture referring to the picture parameter set comprises the single slice.

18. The method of clause 17, wherein the format rule further specifies to include an indication indicating whether each picture referring to the picture parameter set has only one slice in the picture parameter set.

19. The method of clause 17, wherein the format rule further specifies to include an indication indicating whether each picture referring to the picture parameter set has only one intra slice in the picture parameter set.

20. The method of clause 17, wherein the format rule further specifies to include an indication indicating whether each picture referring to the picture parameter set has only one inter slice in the picture parameter set.

21. The method of clause 1, wherein the format rule further specifies that an indication indicating whether each picture referring to the picture parameter set has only one slice corresponds to a flag included in the picture parameter set.

22. The method of clause 21, wherein the flag having a value of 1 specifies that each picture referring to the picture parameter set has only one slice and the flag having a value of 0 specifies that each picture referring to the picture parameter set has more than one slices.

23. The method of clause 21, wherein the format rule further specifies to omit the indication and infer the indication from a slice partitioning information included in the picture parameter set.

24. The method of clause 21, wherein the format rule further specifies that the indication is equal to 0 in case another indication indicating whether there is only one subpicture in each picture is greater than 0.

25. The method of clause 21, wherein the format rule further specifies that the flag is same for all picture parameter sets referenced by the one or more pictures in a coded layer video sequence.

26. The method of clause 21, wherein the format rule further specifies that the flag is equal to 1 in case that one_slice_per_pic_constraint_flag is equal to 1.

27. The method of clause 21, wherein the format rule further specifies to update semantics of one_slice_per_pic_constraint_flag by adding that one_slice_per_pic_constraint_flag equal to 1 specifies that the flag is equal to 1.

28. The method of clause 21, wherein the format rule further specifies to omit the flag in case that it is known from the picture parameter set that there is only one subpicture in each picture and that each subpicture contains only one slice.

29. The method of clause 17, wherein the format rule further specifies that values of the one or more syntax elements are inferred to be equal to 0 or 1 in case that it is indicated that each picture referring to the picture parameter set comprises the single slice.

30. The method of clause 17, wherein the one or more syntax elements include an eighth flag (wp_info_in_ph_flag) indicative of whether weighted prediction information is included in the picture header syntax structure and wherein the format rule further specifies, in case that it is indicated that each picture referring to the picture parameter set comprises the single slice, i) a value of each of other syntax elements than wp_info_in_ph_flag is inferred to be equal to either 1 or 0 and ii) a value of wp_info_in_ph_flag is inferred to be equal to 0 in case that a value of a ninth flag (rpl_info_in_ph_flag) indicative of whether reference picture list information is included in the picture header syntax structure is equal to 0 and is inferred to be either 1 or 0 in case that the value of rpl_info_in_ph_flag is equal to 1.

31. The method of clause 1, wherein the format rule further specifies, in case that it is indicated that each picture referring to the picture parameter set comprises the single slice, to omit a picture header in a slice header flag in a slice header syntax structure in case that it is indicated that each picture referring to the picture parameter set comprises the single slice and infer that a value of the picture header is equal to 1.

32. The method of clause 1, wherein the format rule further specifies, in case that it is indicated that each picture referring to the picture parameter set comprises the single slice, to omit a slice address parameter in a slice header syntax structure.

33. The method of clause 32, wherein the format rule further specifies that a value of the slice address parameter is inferred to be equal to 0 in case i) that it is indicated that each picture referring to the picture parameter set comprises the single slice and ii) that rect_slice_flag is equal to 0.

34. The method of clause 1, wherein the format rule further specifies to omit a parameter indicative of a number of tiles in a slice in case that it is indicated that each picture referring to the picture parameter set comprises the single slice.

35. The method of clause 34, wherein the format rule further specifies that a value of the parameter is inferred to be equal to 'NumTilesInPic−1' in case i) that it is indicated that each picture referring to the picture parameter set comprises the single slice and ii) that rect_slice_flag is equal to 0, the NumTilesInPic indicating a number of tiles in a picture.

36. The method of clause 1, wherein the format rule further specifies that a value of the one or more syntax elements is to be equal to 0 in case that one_slice_per_pic_constraint_flag is equal to 1.

37. The method of clause 1, wherein the format rule further specifies that a value of a picture header in a slice header flag is equal to 1 in case that one_slice_per_pic_constraint_flag is equal to 1.

38. The method of clause 1, wherein the format rule further specifies to omit rect_slice_flag in case that it is indicated that each picture referring to the picture parameter set comprises the single slice.

39. The method of clause 38, wherein the format rule further specifies that a value of rect_slice_flag is inferred to be equal to 1 in case that it is indicated that each picture referring to the picture parameter set comprises the single slice.

40. The method of clause 1, wherein the format rule further specifies to omit single_slice_per_subpic_flag in case that it is indicated that each picture referring to the picture parameter set comprises the single slice.

41. The method of clause 40, wherein the format rule further specifies that a value of single_slice_per_subpic_flag is inferred to be equal to 1 in case that it is indicated that each picture referring to the picture parameter set comprises the single slice.

42. The method of clause 1, wherein the format rule further specifies to omit loop_filter_across_slices_enabled_flag in case that it is indicated that each picture referring to the picture parameter set comprises the single slice.

43. The method of clause 42, wherein the format rule further specifies to omit a tenth flag in the bitstream in case that it is indicated that each picture referring to the picture parameter set comprises the single slice, wherein the tenth flag specifies whether in-loop filtering operations across slice boundaries are enabled for pictures referring to the picture parameter set.

44. The method of clause 1, wherein the format rule further specifies to include whether it is indicated that each picture referring to the picture parameter set comprises the single slice in a sequence parameter set associated with a coded layer video sequence.

45. The method of clause 1, wherein the format rule further specifies to include an indication indicating whether each picture in a coded layer video sequence has only one tile in a sequence parameter set associated with the coded layer video sequence.

46. The method of clause 1, wherein the format rule further specifies, in case that each picture associated with a first picture parameter set has only one slice, to omit one or more slice partitioning related syntax elements from the first picture parameter set.

47. The method of clause 1, wherein the format rule further specifies, in case that each picture associated with a first picture parameter set has only one tile, to omit one or more slice partitioning related syntax elements from the first picture parameter set.

48. The method of any of clauses 1 to 47, wherein the conversion includes encoding the video into the bitstream.

49. The method of any of clauses 1 to 47, wherein the conversion includes decoding the video from the bitstream.

50. The method of clause 1 to 47, wherein the conversion includes generating the bitstream from the video; and the method further comprises: storing the bitstream in a non-transitory computer-readable recording medium.

51. A video processing apparatus comprising a processor configured to implement a method recited in any one or more of clauses 1 to 50.

52. A method of storing a bitstream of a video, comprising, a method recited in any one of clauses 1 to 50, and further including storing the bitstream to a non-transitory computer-readable recording medium.

53. A computer readable medium storing program code that, when executed, causes a processor to implement a method recited in any one or more of clauses 1 to 50.

54. A computer readable medium that stores a coded representation or a bitstream representation generated according to any of the above described methods.

55. A video processing apparatus for storing a bitstream representation, wherein the video processing apparatus is configured to implement a method recited in any one or more of clauses 1 to 50.

The third set of clauses describe certain features and aspects of the disclosed techniques in the previous section (e.g., Item 1.1.g in 'Example techniques and embodiments' section).

Figure 7B:
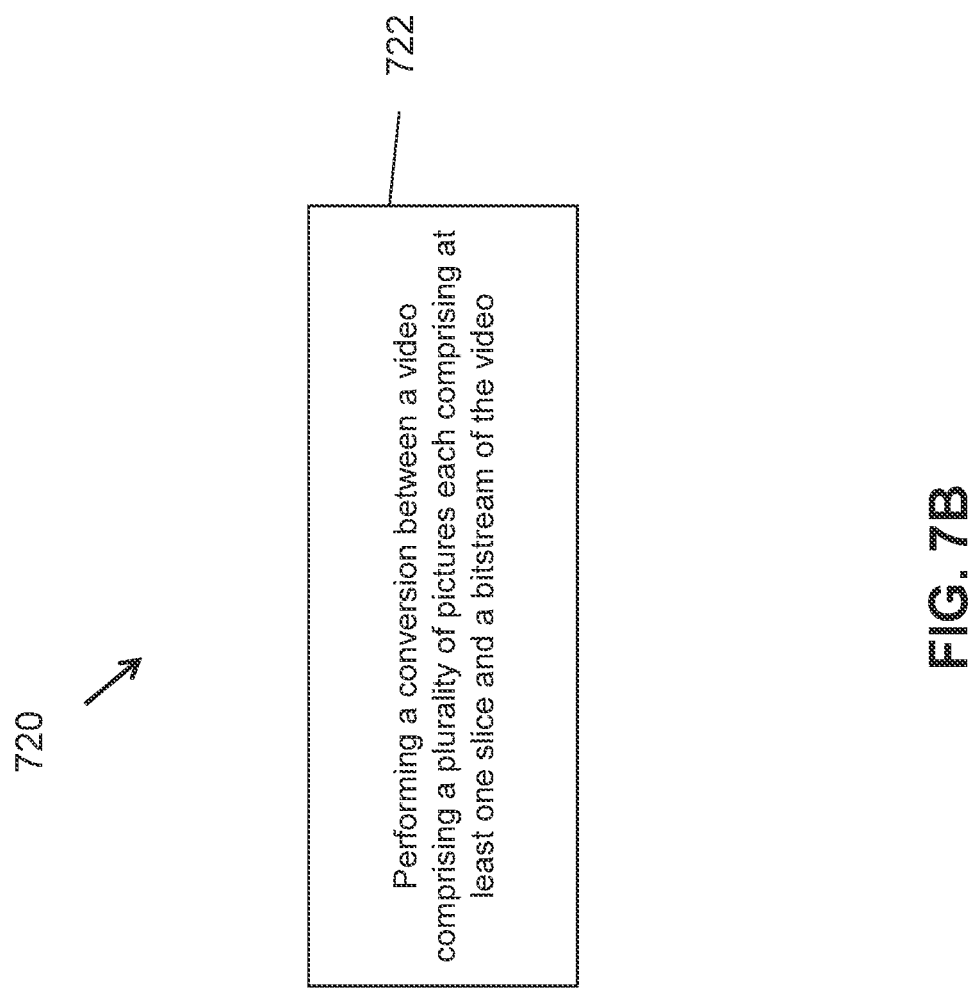

1. A method of video processing (e.g., method 720 as shown in FIG. 7B), comprising: performing 722 a conversion between a video comprising a plurality of pictures each comprising at least one slice and a bitstream of the video, wherein the bitstream conforms to a format rule; wherein the format rule specifies that a first flag in the bitstream indicates whether a picture header syntax structure of a picture is included in a slice header of a slice of the picture; and wherein the format rule specifies that, responsive to any of six flags in a picture parameter set associated with the picture is equal to 1, the first flag is equal to 0.

2. The method of clause 1, wherein the six flags are indicative of whether certain coding syntax elements are included either in the picture header syntax structure or directly in the slice header.

3. The method of any of clauses 1 and 2, wherein the six flags include a second flag indicative of whether reference picture list information is included either in the picture header syntax structure or directly in the slice header.

4. The method of any of clauses 1 to 3, wherein the six flags include a third flag indicative of whether deblocking filter information is included either in the picture header syntax structure or directly in the slice header.

5. The method of any of clauses 1 to 4, wherein the six flags include a fourth flag indicative of whether sample adaptive offset filter information is included either in the picture header syntax structure or directly in the slice header.

6. The method of any of clauses 1 to 5, wherein the six flags include a fifth flag indicative of whether adaptive loop filter information is included either in the picture header syntax structure or directly in the slice header.

7. The method of any of clauses 1 to 6, wherein the six flags include a sixth flag indicative of whether weighted prediction information is included either in the picture header syntax structure or directly in the slice header.

8. The method of any of clauses 1 to 7, wherein the six flags include a seventh flag indicative of whether quantization parameter delta information is included either in the picture header syntax structure or directly in the slice header.

9. The method of any of clauses 1 to 8, wherein the first flag equal to 0 specifies that the picture header syntax structure is not present in the slice header.

10. The method of any of clauses 1 to 9, wherein one of the six flags equal to 1 specifies that associated information is included in the picture header syntax structure.

11. The method of any of clauses 1 to 10, wherein the conversion includes encoding the video into the bitstream.

12. The method of any of clauses 1 to 10, wherein the conversion includes decoding the video from the bitstream.

13. The method of clause 1 to 10, wherein the conversion includes generating the bitstream from the video, and the method further comprises: storing the bitstream in a non-transitory computer-readable recording medium.

14. A video processing apparatus comprising a processor configured to implement a method recited in any one or more of clauses 1 to 13.

15. A method of storing a bitstream of a video, comprising, a method recited in any one of clauses 1 to 13, and further including storing the bitstream to a non-transitory computer-readable recording medium.

16. A computer readable medium storing program code that, when executed, causes a processor to implement a method recited in any one or more of clauses 1 to 13.

17. A computer readable medium that stores a bitstream generated according to any of the above described methods.

18. A video processing apparatus for storing a bitstream, wherein the video processing apparatus is configured to implement a method recited in any one or more of clauses 1 to 13.

The fourth set of clauses describe certain features and aspects of the disclosed techniques in the previous section (e.g., Item 2 in 'Example techniques and embodiments' section).

Figure 7C:
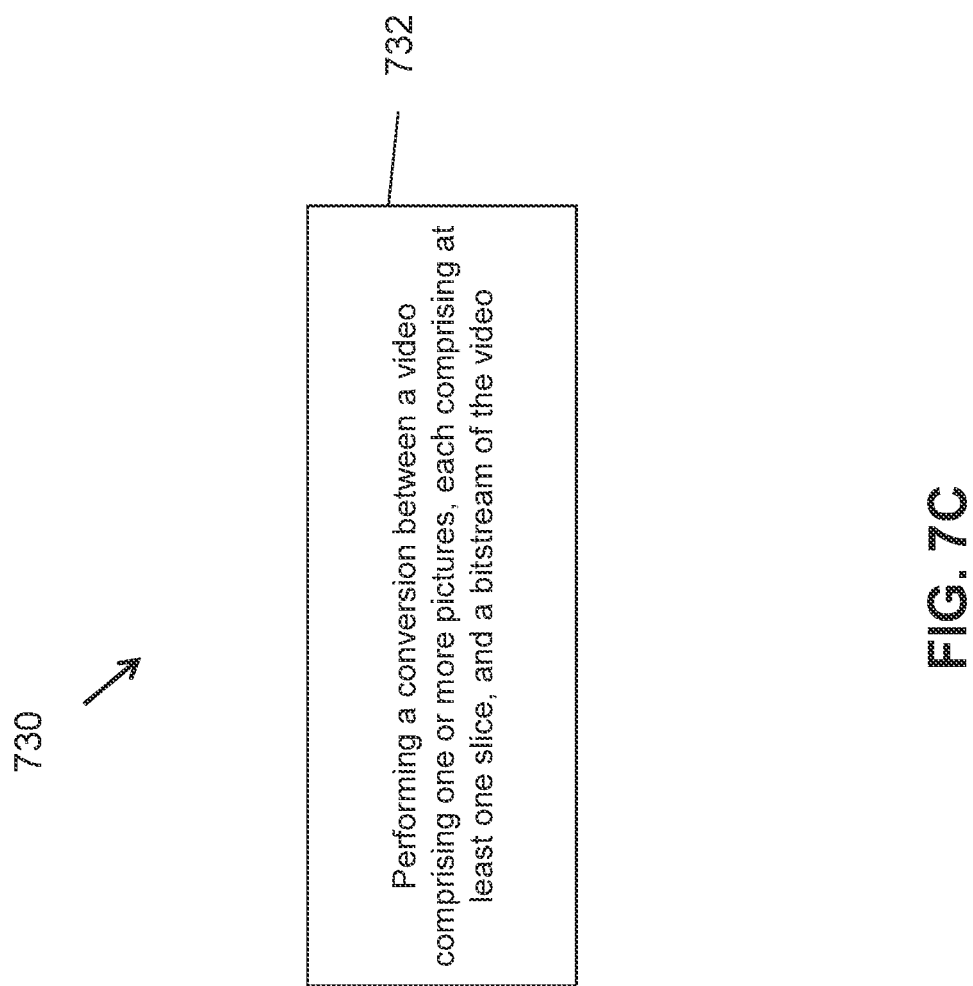

1. A method of video processing (e.g., method 730 as shown in FIG. 7C), comprising: performing 732 a conversion between a video comprising one or more pictures, each comprising at least one slice, and a bitstream of the video, wherein the bitstream conforms to a format rule, wherein the format rule specifies to include a first field indicative of presence of a second field identifying a maximum index for a reference picture used for coding a slice based on a condition; wherein the condition is representable as a logical expression "A & (B||C)", in which:

A indicates that a first flag indicating whether reference picture list information is included in a picture header syntax structure is equal to 1, or a network abstraction layer (NAL) unit type is not equal to an instantaneous decoding refresh (IDR) type, or a second flag indicating whether reference picture list information could be present in slice headers of slices with IDR NAL unit types is equal to 1, B indicates that a slice_type is equal to P or B, and a number of reference entries in reference picture list 0 is greater than 1, C indicates the slice_type is equal to B and a number of reference entries in reference picture list 1 is greater than 1, and wherein "&" is logical "and" operation and "||" is logical "or" operation.

2. The method of clause 1, wherein the first flag corresponds to rpl_info_in_ph_flag.

3. The method of clause 1, wherein the first flag equal to 1 specifies that the reference picture list information is present in the picture header syntax structure and not present in the slice headers and the first flag equal to 0 specifies that the reference picture list information is not present in the picture header syntax structure and that there are chances for the reference picture list information to be directly present in the slice headers.

4. The method of clause 1, wherein the second flag corresponds to sps_idr_rpl_present_flag.

5. The method of clause 1, wherein the first field corresponds to num_ref_idx_active_override_flag.

6. The method of clause 1, wherein the second field corresponds to num_ref_idx_active_minus1.

7. The method of any of clauses 1 to 6, wherein the conversion includes encoding the video into the bitstream.

8. The method of any of clauses 1 to 6, wherein the conversion includes decoding the video from the bitstream.

9. The method of any of clauses 1 to 6, wherein the conversion includes generating the bitstream from the video; and the method further comprises: storing the bitstream in a non-transitory computer-readable recording medium.

10. A video processing apparatus comprising a processor configured to implement a method recited in any one or more of clauses 1 to 9.

11. A method of storing a bitstream of a video, comprising, a method recited in any one of clauses 1 to 9, and further including storing the bitstream to a non-transitory computer-readable recording medium.

12. A computer readable medium storing program code that, when executed, causes a processor to implement a method recited in any one or more of clauses 1 to 9.

13. A computer readable medium that stores a bitstream generated according to any of the above described methods.

The fifth set of clauses describe certain features and aspects of the disclosed techniques in the previous section (e.g., Items 2 and 3 in 'Example techniques and embodiments' section).

Figure 7D:
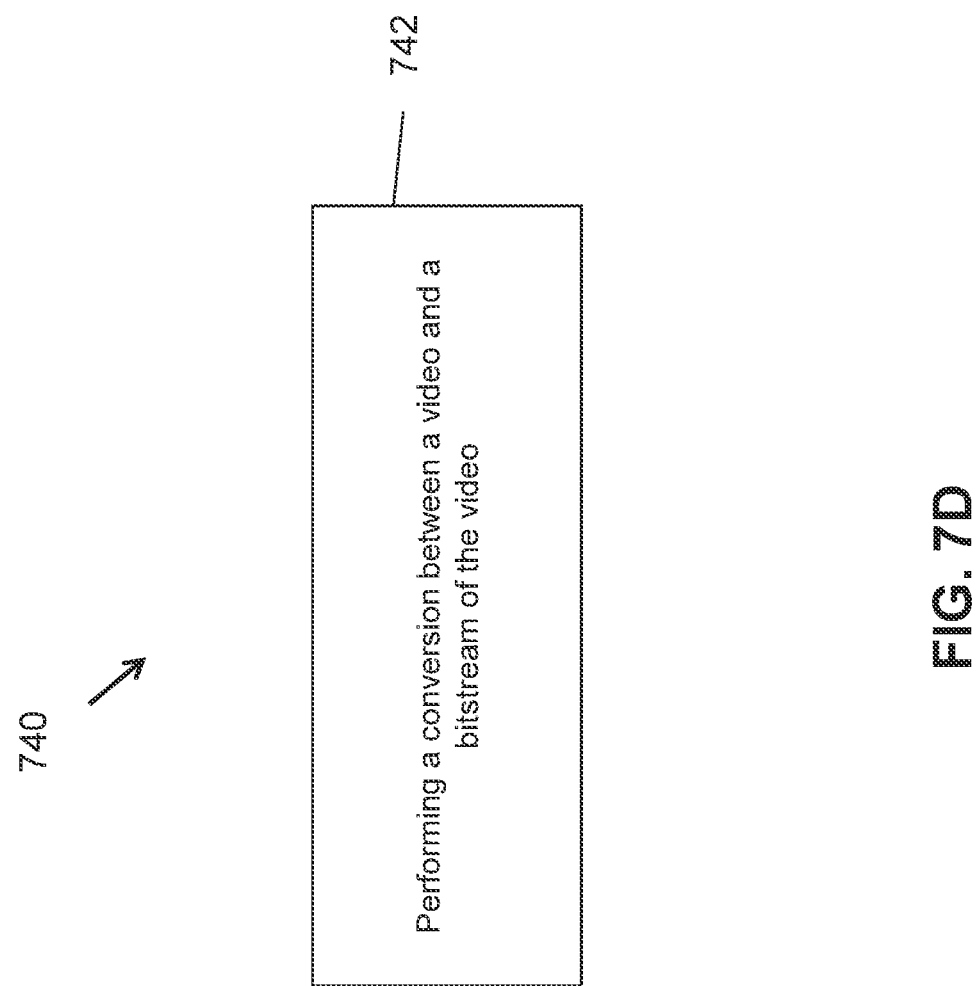

1. A method of video processing (e.g., method 740 as shown in FIG. 7D), comprising: performing a conversion between a video and a bitstream of the video, wherein the bitstream conforms to a format rule, and wherein the format rule specifies a condition that controls whether or how one or more syntax elements related to picture order counts for a long term reference picture are included in a reference picture list syntax structure in the bitstream.

2. The method of clause 1, wherein the format rule further specifies that the one or more syntax elements are included in the reference picture list syntax structure responsive to an index of a reference picture list being smaller than a number of reference picture list syntax structures that are included in a sequence parameter set.

3. The method of clause 2, wherein the format rule further specifies whether a flag indicating whether the one or more syntax elements are included in the reference picture list syntax structure is included in the reference picture list syntax structure.

4. The method of clause 3, wherein the flag corresponds to ltrp_in_header_flag.

5. The method of clause 4, wherein the format rule further specifies the omission of ltrp_in_header_flag from being included in the reference picture list syntax structure when the index of the reference picture list is equal to a number of reference picture list syntax structures in the sequence parameter set.

6. The method of clause 5, wherein the format rule further specifies the value of ltrp_in_header_flag is inferred to be equal to 1 when the index of the reference picture list is equal to a number of reference picture list syntax structures in the sequence parameter set.

7. The method of clause 1, wherein the format rule further specifies that the one or more syntax elements are included in the reference picture list syntax structure responsive to whether the reference picture list syntax structure is included in a sequence parameter set of the bitstream.

8. The method of clause 1, wherein the format rule further specifies that the one or more syntax elements are omitted in a reference picture list syntax structure and that the one or more syntax elements are included for each of the reference picture list syntax structure and another reference picture list syntax structure.

9. The method of clause 1, wherein the format rule further specifies that the one or more syntax elements are omitted in a reference picture list syntax structure and that the one or more syntax elements are included for each of reference of picture lists.

10. The method of clause 1, wherein the format rule further specifies that the one or more syntax elements are omitted in a reference picture list syntax structure and the one or more syntax elements are included for the reference picture list syntax structure and another reference picture list syntax structure.

11. A method of video processing (e.g., method 740 as shown in FIG. 7D), comprising: performing 742 a conversion between a video and a bitstream of the video, wherein the bitstream conforms to a format rule, wherein the format rule specifies whether a syntax element related to reference pictures in a reference picture list is included in a reference picture list syntax structure.

12. The method of clause 11, wherein the reference picture list is a reference picture list 1.

13. The method of clause 11, wherein the format rule is dependent on whether a variable X is equal to a specific value, wherein X depends on a slice type of the video region.

14. The method of clause 11, wherein the specific value is equal to 1 or 2.

15. The method of any of above clauses, wherein the syntax element comprises a flag indicative of presence of a reference picture list in a sequence parameter set.

16. The method of any of above clauses, wherein the syntax element indicates an index of a reference picture list.

17. The method of any of above clauses, wherein the syntax element indicates a value of least significant bits of picture order counts of a long term reference picture.

18. The method of any of above clauses, wherein the syntax element indicates whether a difference between most significant bits of picture order counts of a current picture and a long-term reference picture are included in the bitstream.

19. The method of any of above clauses, wherein the syntax element indicates whether a difference between most significant bits of picture order counts of a current picture and a long-term reference picture are included in the bitstream.

20. The method of any of clauses 1 to 19, wherein the conversion includes encoding the video into the bitstream.

21. The method of any of clauses 1 to 19, wherein the conversion includes decoding the video from the bitstream.

22. The method of clause 1 to 19, wherein the conversion includes generating the bitstream from the video; and the method further comprises: storing the bitstream in a non-transitory computer-readable recording medium.

23. A video processing apparatus comprising a processor configured to implement a method recited in any one or more of clauses 1 to 22.

24. A method of storing a bitstream of a video, comprising, a method recited in any one of clauses 1 to 22, and further including storing the bitstream to a non-transitory computer-readable recording medium.

25. A computer readable medium storing program code that, when executed, causes a processor to implement a method recited in any one or more of clauses 1 to 22.

26. A computer readable medium that stores a bitstream generated according to any of the above described methods.

27. A video processing apparatus for storing a bitstream, wherein the video processing apparatus is configured to implement a method recited in any one or more of clauses 1 to 22.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (CD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   decoding a video comprising one or more pictures from a bitstream of the video,
   wherein the bitstream conforms to a format rule, and
   wherein the format rule specifies to include an indication in a picture parameter set (PPS) of the bitstream to indicate picture partitioning information,
   wherein whether multiple flags, indicative of whether certain coding syntax elements are included either in a picture header syntax structure or in a slice header, are allowed to be included in the PPS of the bitstream depends on the indication included in the PPS,
   wherein the multiple flags include a pps_rpl_info_in_ph_flag, a pps_dbf_info_in_ph_flag, a pps_sao_info_in_ph_flag, a pps_alf_info_in_ph_flag, a pps_wp_info_in_ph_flag, and a pps_qp_delta_info_in_ph_flag,
   wherein in response to the indication with a second value, the multiple flags are not included in the PPS of the bitstream, and during decoding, values of the multiple flags are inferred to be equal to 0 which indicates that the certain coding syntax elements are included directly in the slice header, and
   wherein the indication equal to the second value indicates that each picture referring to the PPS comprises a single slice.

2. The method of claim 1, wherein the multiple flags include a first flag indicative of whether reference picture list information is included either in the picture header syntax structure or directly in the slice header, and wherein the first flag is the pps_rpl_info_in_ph_flag.

3. The method of claim 1, wherein the multiple flags include a second flag indicative of whether deblocking filter information is included either in the picture header syntax structure or directly in the slice header, and wherein the second flag is the pps_dbf_info_in_ph_flag.

4. The method of claim 1, wherein the multiple flags include a third flag indicative of whether sample adaptive offset filter information is included either in the picture header syntax structure or directly in the slice header, and wherein the third flag is the pps_sao_info_in_ph_flag.

5. The method of claim 1, wherein the multiple flags include a fourth flag indicative of whether adaptive loop filter information is included either in the picture header syntax structure or directly in the slice header, and wherein the fourth flag is the pps_alf_info_in_ph_flag.

6. The method of claim 1, wherein the multiple flags include a fifth flag indicative of whether weighted prediction information is included either in the picture header syntax structure or directly in the slice header, and wherein the fifth flag is the pps_wp_info_in_ph_flag.

7. The method of claim 1, wherein the multiple flags include a sixth flag indicative of whether quantization parameter delta information is included either in the picture header syntax structure or directly in the slice header, and wherein the sixth flag is the pps_qp_delta_info_in_ph_flag.

8. The method of claim 1, wherein the format rule further specifies that a seventh flag that indicates whether in-loop filtering operations across slice boundaries are enabled for the one or more pictures referring to the PPS is selectively included in the PPS of the bitstream responsive to a value of the indication.

9. The method of claim 8 wherein the format rule further specifies to omit the seventh flag in response to the indication with the second value, and during decoding, a value of the seventh flag is inferred to be equal to 0 which indicates that the in-loop filtering operations across the slice boundaries are disabled for the PPS.

10. The method of claim 1, wherein in response to the indication with a first value, the multiple flags are allowed to be included in the PPS of the bitstream, and
    wherein the indication equal to the first value indicates that each picture referring to the PPS is allowed to comprise more than one slice.

11. An apparatus for processing video data comprising a processor and a non-transitory memory with instructions thereon, wherein the instructions upon execution by the processor, cause the processor to:
    encode a video comprising one or more pictures into a bitstream of the video;
    wherein the bitstream conforms to a format rule, and
    wherein the format rule specifies to include an indication in a picture parameter set (PPS) of the bitstream to indicate picture partitioning information,
    wherein whether multiple flags, indicative of whether certain coding syntax elements are included either in a picture header syntax structure or in a slice header, are allowed to be included in the PPS of the bitstream depends on the indication included in the PPS,
    wherein the multiple flags include a pps_rpl_info_in_ph_flag, a pps_dbf_info_in_ph_flag, a pps_sao_info_in_ph_flag, a pps_alf_info_in_ph_flag, a pps_wp_info_in_ph_flag, and a pps_qp_delta_info_in_ph_flag,
    wherein in response to the indication with a second value, the multiple flags are not included in the PPS of the bitstream, and during decoding, values of the multiple flags are inferred to be equal to 0 which indicates that the certain coding syntax elements are included directly in the slice header, and
    wherein the indication equal to the second value indicates that each picture referring to the PPS comprises a single slice.

12. The apparatus of claim 11, wherein the multiple flags include a first flag indicative of whether reference picture list information is included either in the picture header syntax structure or directly in the slice header;

wherein the multiple flags include a second flag indicative of whether deblocking filter information is included either in the picture header syntax structure or directly in the slice header, wherein the multiple flags include a third flag indicative of whether sample adaptive offset filter information is included either in the picture header syntax structure or directly in the slice header, wherein the multiple flags include a fourth flag indicative of whether adaptive loop filter information is included either in the picture header syntax structure or directly in the slice header, wherein the multiple flags include a fifth flag indicative of whether weighted prediction information is included either in the picture header syntax structure or directly in the slice header, and wherein the multiple flags include a sixth flag indicative of whether quantization parameter delta information is included either in the picture header syntax structure or directly in the slice header.

13. The apparatus of claim 11, wherein the format rule further specifies that a seventh flag that indicates whether in-loop filtering operations across slice boundaries are enabled for the one or more pictures referring to the PPS is selectively included in the PPS of the bitstream responsive to a value of the indication, and wherein the format rule further specifies to omit the seventh flag in response to the indication with the second value, and during decoding, a value of the seventh flag is inferred to be equal to 0 which indicates that the in-loop filtering operations across the slice boundaries are disabled for the PPS.

14. The apparatus of claim 11, wherein in response to the indication with a first value, the multiple flags are allowed to be included in the PPS of the bitstream, and wherein the indication equal to the first value indicates that each picture referring to the PPS is allowed to comprise more than one slice.

15. A non-transitory computer-readable storage medium storing instructions that cause a processor to:

decode a video comprising one or more pictures from a bitstream of the video, wherein the bitstream conforms to a format rule, and wherein the format rule specifies to include an indication in a picture parameter set (PPS) of the bitstream to indicate picture partitioning information, wherein whether multiple flags, indicative of whether certain coding syntax elements are included either in a picture header syntax structure or in a slice header, are allowed to be included in the PPS of the bitstream depends on the indication included in the PPS, wherein the multiple flags include a pps_rpl_info_in_ph_flag, a pps_dbf_info_in_ph_flag, a pps_sao_info_in_ph_flag, a pps_alf_info_in_ph_flag, a pps_wp_info_in_ph_flag, and a pps_qp_delta_info_in_ph_flag, wherein in response to the indication with a second value, the multiple flags are not included in the PPS of the bitstream, and during decoding, values of the multiple flags are inferred to be equal to 0 which indicates that the certain coding syntax elements are included directly in the slice header, and wherein the indication equal to the second value indicates that each picture referring to the PPS comprises a single slice.

16. The non-transitory computer-readable storage medium of claim 15, wherein the multiple flags include a first flag indicative of whether reference picture list information is included either in the picture header syntax structure or directly in the slice header;

wherein the multiple flags include a second flag indicative of whether deblocking filter information is included either in the picture header syntax structure or directly in the slice header, wherein the multiple flags include a third flag indicative of whether sample adaptive offset filter information is included either in the picture header syntax structure or directly in the slice header, wherein the multiple flags include a fourth flag indicative of whether adaptive loop filter information is included either in the picture header syntax structure or directly in the slice header, wherein the multiple flags include a fifth flag indicative of whether weighted prediction information is included either in the picture header syntax structure or directly in the slice header, and wherein the multiple flags include a sixth flag indicative of whether quantization parameter delta information is included either in the picture header syntax structure or directly in the slice header.

17. The non-transitory computer-readable storage medium of claim 15, wherein the format rule further specifies that a seventh flag that indicates whether in-loop filtering operations across slice boundaries are enabled for the one or more pictures referring to the PPS is selectively included in the PPS of the bitstream responsive to a value of the indication, and wherein the format rule further specifies to omit the seventh flag in response to the indication with the second value, and during decoding, a value of the seventh flag is inferred to be equal to 0 which indicates that the in-loop filtering operations across the slice boundaries are disabled for the PPS.

18. The non-transitory computer-readable storage medium of claim 15, wherein in response to the indication with a first value, the multiple flags are allowed to be included in the PPS of the bitstream, and wherein the indication equal to the first value indicates that each picture referring to the PPS is allowed to comprise more than one slice.

19. A method for storing a bitstream of a video, comprising:

generating the bitstream of the video comprising one or more pictures; and storing the bitstream in a non-transitory computer-readable recording medium, wherein the bitstream conforms to a format rule, and wherein the format rule specifies to include an indication in a picture parameter set (PPS) of the bitstream to indicate picture partitioning information, wherein whether multiple flags, indicative of whether certain coding syntax elements are included either in a picture header syntax structure or in a slice header, are allowed to be included in the PPS of the bitstream depends on the indication included in the PPS, wherein the multiple flags include a pps_rpl_info_in_ph_flag, a pps_dbf_info_in_ph_flag, a pps_sao_info_in_ph_flag, a pps_alf_info_in_ph_flag, a pps_wp_info_in_ph_flag, and a pps_qp_delta_info_in_ph_flag, wherein in response to the indication with a second value, the multiple flags are not included in the PPS of the bitstream, and during decoding, values of the multiple flags are inferred to be equal to 0 which indicates that the certain coding syntax elements are included directly in the slice header, and wherein the indication equal to the second value indicates that each picture referring to the PPS comprises a single slice.

20. The method of claim 19, wherein the multiple flags include a first flag indicative of whether reference picture list information is included either in the picture header syntax structure or directly in the slice header, wherein the multiple flags include a second flag indicative of whether deblocking filter information is included either in the picture header syntax structure or directly in the slice header, wherein the multiple flags include a third flag indicative of whether sample adaptive offset filter information is included either in the picture header syntax structure or directly in the slice header, wherein the multiple flags include a fourth flag indicative of whether adaptive loop filter information is included either in the picture header syntax structure or directly in the slice header, wherein the multiple flags include a fifth flag indicative of whether weighted prediction information is included either in the picture header syntax structure or directly in the slice header, wherein the multiple flags include a sixth flag indicative of whether quantization parameter delta information is included either in the picture header syntax structure or directly in the slice header;

wherein the format rule further specifies that a seventh flag that indicates whether in-loop filtering operations across slice boundaries are enabled for the one or more pictures referring to the PPS is selectively included in the PPS of the bitstream responsive to a value of the indication, wherein the format rule further specifies to omit the seventh flag in response to the indication with the second value, and during decoding, a value of the seventh flag is inferred to be equal to 0 which indicates that the in-loop filtering operations across the slice boundaries are disabled for the PPS, and wherein the format rule further specifies that the indication is included in the PPS.

* * * * *